(12) United States Patent
Sullivan

(10) Patent No.: US 9,015,605 B2
(45) Date of Patent: Apr. 21, 2015

(54) CROSS-PLATFORM CONTENT MANAGEMENT FOR ONLINE COMMUNITY ADVOCACY MANAGEMENT PLATFORM

(71) Applicant: Daniel Sullivan, Hingham, MA (US)

(72) Inventor: Daniel Sullivan, Hingham, MA (US)

( * ) Notice: Subject to any disclaimer, the term of this patent is extended or adjusted under 35 U.S.C. 154(b) by 158 days.

(21) Appl. No.: 13/722,315

(22) Filed: Dec. 20, 2012

(65) Prior Publication Data

US 2014/0181693 A1  Jun. 26, 2014

(51) Int. Cl.
*G06F 3/00* (2006.01)
*G06F 3/048* (2013.01)

(52) U.S. Cl.
CPC ........................... *G06F 3/048* (2013.01)

(58) Field of Classification Search
USPC .................................................. 715/753, 751
See application file for complete search history.

(56) References Cited

U.S. PATENT DOCUMENTS

| | | | | |
|---|---|---|---|---|
| 8,539,359 | B2 * | 9/2013 | Rapaport et al. | 715/751 |
| 2012/0005224 | A1 * | 1/2012 | Ahrens et al. | 707/769 |
| 2012/0072855 | A1 * | 3/2012 | Baldwin et al. | 715/752 |
| 2012/0094721 | A1 * | 4/2012 | Brondmo et al. | 455/566 |
| 2012/0197782 | A1 * | 8/2012 | Ghosh et al. | 705/38 |
| 2012/0296920 | A1 * | 11/2012 | Sahni et al. | 707/749 |
| 2013/0018685 | A1 * | 1/2013 | Parnaby et al. | 705/7.13 |
| 2013/0097251 | A1 * | 4/2013 | Stibel et al. | 709/206 |
| 2013/0110978 | A1 * | 5/2013 | Gordon et al. | 709/218 |
| 2013/0151613 | A1 * | 6/2013 | Dhawan et al. | 709/204 |
| 2013/0185220 | A1 * | 7/2013 | Good et al. | 705/329 |
| 2014/0067523 | A1 * | 3/2014 | Barnett et al. | 705/14.45 |
| 2014/0164979 | A1 * | 6/2014 | Deeter et al. | 715/774 |

* cited by examiner

*Primary Examiner* — Omar Abdul-Ali
(74) *Attorney, Agent, or Firm* — Parker Ibrahim & Berg LLC; James M. Behmke; Stephen D. LeBarron

(57) ABSTRACT

For an online community advocacy management platform, techniques (APIs) are described for pulling comments in from the app/plug-in, and cross-pollinating the social online community (e.g., social network website "walls") and app/plug-in content in an intelligent manner (which content, how often, etc.).

18 Claims, 21 Drawing Sheets

CROSS-PLATFORM CONTENT MANAGEMENT FOR ONLINE COMMUNITY ADVOCACY MANAGEMENT PLATFORM

CROSS-REFERENCE TO RELATED APPLICATIONS

The present application is related to the following copending U.S. patent applications, each of which having been filed on even date herewith, each of which also having their contents being incorporated by reference herein in their entirety:
  U.S. patent application Ser. No. 13/721,390, entitled "ONLINE COMMUNITY ADVOCACY MANAGEMENT PLATFORM" by Daniel Sullivan;
  U.S. patent application Ser. No. 13/722,305, entitled "ADVOCACY RETENTION SCORING FOR ONLINE COMMUNITY ADVOCACY MANAGEMENT PLATFORM" by Daniel Sullivan;
  U.S. patent application Ser. No. 13/722,320, entitled "CUSTOMER REWARD CORRELATION FOR ONLINE COMMUNITY ADVOCACY MANAGEMENT PLATFORM" by Daniel Sullivan;
  U.S. patent application Ser. No. 13/722,328, entitled "POPULATING GHOST IDENTITIES FOR ONLINE COMMUNITY ADVOCACY MANAGEMENT PLATFORM" by Daniel Sullivan; and
  U.S. patent application Ser. No. 13/722,336, entitled "CONTRIBUTION FILTERING FOR ONLINE COMMUNITY ADVOCACY MANAGEMENT PLATFORM" by Daniel Sullivan.

TECHNICAL FIELD

The present invention relates generally to online social media, and, more particularly, to online community advocacy management.

BACKGROUND

Computer users are able to access and share vast amounts of information through various local and wide area computer networks including proprietary networks as well as public networks such as the Internet. Typically, a web browser installed on a user's computing device facilitates access to and interaction with information located at various network servers identified by, for example, associated uniform resource locators (URLs).

In particular, over the past several years, the amount of personal information that individuals share online has increased dramatically. Many websites provide an online community that provides content focusing on a common interest or theme (e.g., a "fan site" for a television program or musical artist), and allows people to join the online community and share personal information with other members of the online community.

Conventional approaches to enable sharing of user-generated content include various information sharing technologies or platforms such as social networking websites. Such websites may include, be linked with, or provide a platform for is applications enabling users to view "profile" pages created or customized by other users where visibility and interaction with such profiles by other users is governed by some characteristic set of rules. By way of example, a user profile may include such user-declared information as contact information (e.g., physical and email addresses, telephone numbers, instant messaging nicknames, etc.), background information, job/career information, as well as personal interests. Operators of online social networking sites typically require that new members provide certain personal information to join, including contact information and identifying information (e.g. a name, location, age, etc.).

Typically, members of an online social network communicate with one another and meet other members based on personal information captured in the other member profiles. Also, members of online social networks often request their existing friends to join, creating a web of online relationships that mirror offline ones. A positive consequence of this general trend is the greater ability for groups of friends, families and other acquaintances to communicate online with, and about, each other as members of a social network. For example, a group of friends may share personal information with each other about common interests, individual personal attributes, events, schedules and activity plans and may also access each others' personal information. Another benefit of online social networks is that members can more easily find others who share common interests, goals, lifestyles, etc., without being limited to an online community dedicated to a particular interest. Doing so allows members to expand their social networks.

Social networking websites typically provide mechanisms (referred to as channels) for members to communicate with each other, e.g., emails, invitations, notifications, newsfeeds etc. Social networking applications typically make use of the various channels to provide useful features to the members, such as sending out emails about the member's activities, displaying a newsfeed to the member's friends, and so forth.

Some social network websites provide application developers with the ability to create applications that extend the functionality of the social networking website to is provide new ways for users to interact with each other. For example, an application may provide an interesting way for a member (also called user of the social networking website) to communicate with his friends, or allow users to participate in multi-player games, or collect some interesting information such as news related to a specific topic and display it to the member periodically; another application may provide a "newsfeed" about the activities of the member to that member's friends.

SUMMARY OF THE INVENTION

For an online community advocacy management platform, techniques (APIs) are described for pulling comments in from the app/plug-in, and cross-pollinating the social online community (e.g., social network website "walls") and app/plug-in content in an intelligent manner (which content, how often, etc.).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Figure 1:
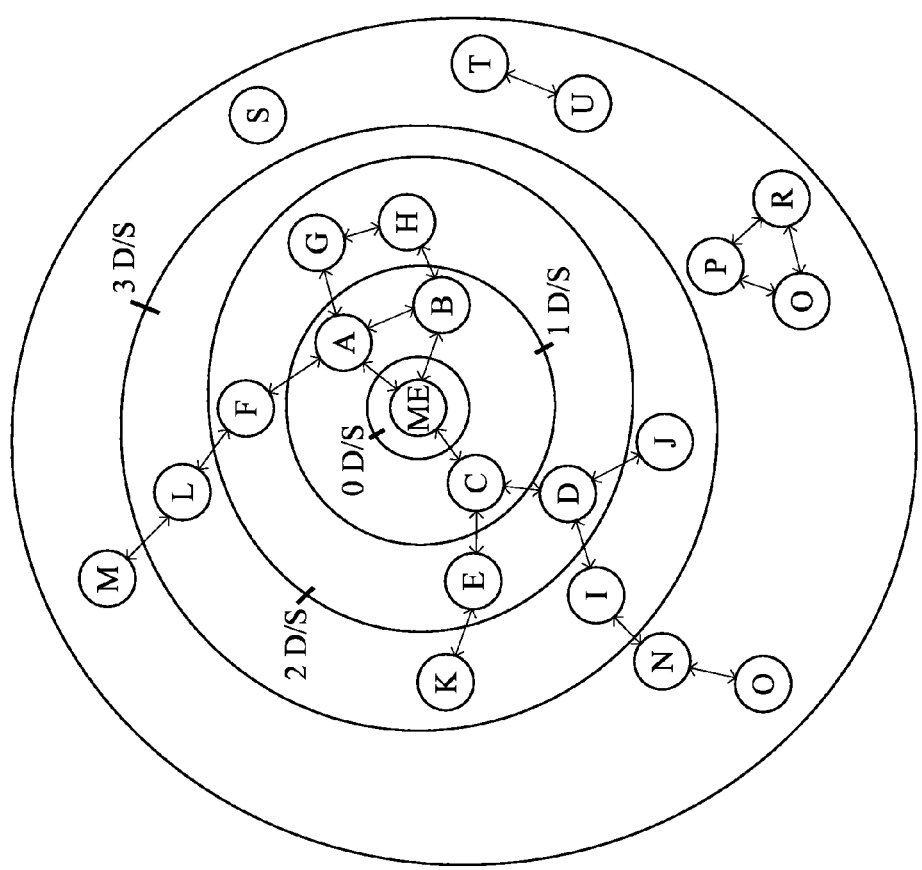
FIG. 1 illustrates an example graph representation of a social network.

A social networking website offers its members the ability to communicate and interact with other members of the website within an "online community". In use, members join the social networking website and then add connections to a number of other members to whom they desire to be connected. As used herein, the term "friend" refers to any other member to whom a member has formed a connection, association, or relationship via the website. Connections may be added explicitly by a member, for example, the member selecting a particular other member to be a friend, or automatically created by the social networking site based on common characteristics of the members (e.g., members who are alumni of the same educational institution). Connections in social networking websites are usually in both directions, but need not be, so the terms "member" and "friend" depend on the frame of reference. For example, if Bob and Joe are both members and connected to each other in the website, Bob and Joe, both members, are also each other's friends. The connection between members may be a direct connection; however, some embodiments of a social networking website allow the connection to be indirect via one or more levels of connections. Also, the term friend need not require that members actually be friends in real life, (which would generally be the case when one of the members is a business or other entity); it simply implies a connection in the social networking website.

Particular embodiments herein relate to a social network environment that includes an infrastructure or platform (hereinafter infrastructure and platform may be used interchangeably) enabling an integrated social network environment. In the present disclosure, the social network environment may be described in terms of a social graph including social graph information. In particular embodiments, one or more computing systems of the social network environment implementing the social network environment include, store, or have access to a data structure that includes social graph information for use in implementing the social network environment described herein. In particular embodiments, the social graph information includes a first set of user nodes that each correspond to a respective user, and a second set of concept nodes that each correspond to a respective concept. As used herein, a "user" or "member" may be an individual (human user), an entity (e.g., an enterprise, business, or third party application), or a group (e.g., of individuals or entities) that interacts or communicates with or over such a social network environment. As used herein, a "concept" may refer to virtually anything that a user may declare or otherwise demonstrate an interest in, a like towards, or a relationship with, such as, by way of example, a sport, a sports team, a genre of music, a musical composer, a hobby, a business (enterprise), an entity, a group, a third party application, a celebrity, a person who is not a registered user, etc. In particular embodiments, each node has, represents, or is represented by, a corresponding web page ("profile page") hosted or accessible in the social network environment. By way of example, a user node may have a corresponding user profile page in which the corresponding user can add content, make declarations, and otherwise express him or herself, while a concept node may have a corresponding concept profile page ("hub") in which a plurality of users can add content, make declarations, and express themselves, particularly in relation to the concept. In particular embodiments, the social graph information further includes a plurality of edges that each define or represent a connection between a corresponding pair of nodes in the social graph.

As used herein, a "connection" may represent a defined relationship between users or concepts of the social network environment, which can be defined logically in a suitable data structure of the social network environment and can be used to define a relationship (hereinafter referred to as an edge) between the nodes corresponding to the users or concepts of the social network environment for which the connection has been made. As used herein, a "friendship" represents a connection, such as a defined social relationship, between a pair of users of the social network environment. A "friend," as used herein, may refer to any user of the social network environment with which another user has formed a connection, friendship, association, or relationship with, causing an edge to be generated between the two users. By way of example, two registered users may become friends with one another explicitly such as, for example, by one of the two users selecting the other for friendship as a result of transmitting, or causing to be transmitted, a friendship request to the other user, who may then accept or deny the request. Alternately, friendships or other connections may be automatically established. Such a social friendship may be visible to other users, especially those who themselves are friends with one or both of the registered users. A friend of a registered user may also have increased access privileges to content, especially user-generated or declared content, on the registered user's profile or other page. As noted above, however, two users who have a friend connection established between them in the social graph may not necessarily be friends (in the conventional sense) in real life (outside the social networking environment). For example, in some implementations, a user may be a business or other non-human entity, and thus, incapable of being a friend with a human being user in the traditional sense of the word.

As used herein, a "fan" may refer to a user that is a supporter of a particular web page, web application, or other web content accessible in the social network environment. In particular embodiments, when a user is a fan of a particular web page ("fans" the particular web page), the user may be listed on that page as a fan for other registered users or the public in general to see. Additionally, an avatar or profile picture of the user may be shown on the page (or in/on any of the pages described below). As used herein, a "like" may refer to something, such as, by way of example and not by way of limitation, an interest, a link, a piece of media (e.g., photo, photo album, video, song, etc.) a concept, an entity, or a page, that a user, and particularly a registered or authenticated user, has declared or otherwise demonstrated that he or she likes, is a fan of (as used herein in various example embodiments, to "like" or to "fan" something, such as a concept or concept profile page, may be defined equivalently in the social networking environment and may be used interchangeably; similarly, to declare oneself a "fan" of something, such as a concept or concept profile page, or to declare that oneself "likes" the thing, may be defined equivalently in the social networking environment and used interchangeably herein), supports, enjoys, or otherwise has a positive view of. As used herein, an "interest" may refer to a user-declared interest, such as a user-declared interest presented in the user's profile page. As used herein, a "want" may refer to virtually anything that a user wants. As described above, a "concept" may refer to virtually anything that a user is may declare or otherwise demonstrate an interest in, a like towards, or a relationship with, such as, by way of example, a sport, a sports team, a genre of music, a musical composer, a hobby, a business (enterprise), an entity, a group, a celebrity, a person who is not a registered user, or even, in some embodiments, another user (e.g., a non-authenticated user), etc. By way of example, there may be a concept node and concept profile page for "Tom Brady," the framed professional football player, created and administered by one or more of a plurality of users (e.g., other than Tom Brady), while the social graph additionally includes a user node and user profile page for Tom Brady created by and administered by Tom Brady, himself. In particular embodiments, as will be described in more detail below, a friend connection or friendship may define or indicate a logical connection defined or represented by an edge between user nodes in the social graph, while a like, want, fan, or other connection demonstrating, generally, an interest or association may define a logical connection or edge between a user node and a concept node in the social graph (and in some embodiments, between two user nodes, or between two concept nodes).

As noted above, a social network is generally defined by the relationships among groups of individuals, and may include relationships ranging from casual acquaintances to close familial bonds. A social network may be represented using a graph structure. Each node of the graph corresponds to a member of the social network. Edges connecting two nodes represent a relationship between two individuals. In addition, the degree of separation between any two nodes is defined as the minimum number of hops required to traverse the graph from one node to the other. A degree of separation between two members is a measure of relatedness between the two members.

FIG. 1 is a graph representation of a social network centered on a given individual (ME). Other members of this social network include A-U whose position, relative to ME's, is referred to by the degree of separation between ME and each other member. Friends of ME, which includes A, B, and C, are separated from ME by one degree of separation (1 d/s). A friend of a friend of ME is separated from ME by 2 d/s. As shown, D, E, F and G are each separated from ME by 2 d/s. A friend of a friend of a friend of ME is separated from ME by 3 d/s. FIG. 1 depicts all nodes separated from ME by more than 3 degrees of separation as belonging to the category ALL.

Degrees of separation in a social network are defined relative to an individual. For example, in ME's social network, H and ME are separated by 2 d/s, whereas in G's social network, H and G are separated by only 1 d/s. Accordingly, each individual will have their own set of first, second and third degree relationships.

As those skilled in the art understand, an individual's social network may be extended to include nodes to an Nth degree of separation. As the number of degrees increases beyond three, however, the number of nodes typically grows at an explosive rate and quickly begins to mirror the ALL set.

Figure 2:
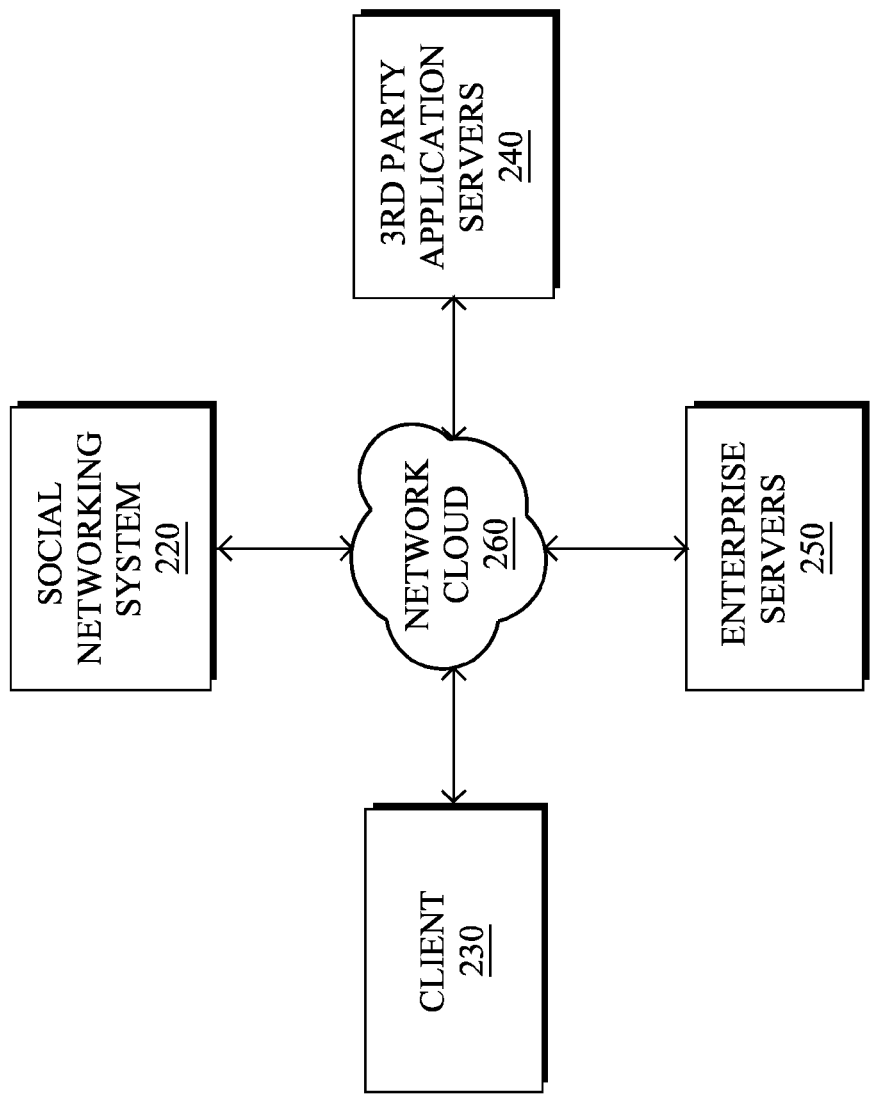
FIG. 2 illustrates an example network environment.

Particular embodiments may operate in, or in conjunction with, a wide area network environment, such as the Internet, including multiple network addressable systems. FIG. 2 illustrates an example network environment, in which various example embodiments may operate, with particular detailed views shown in FIGS. 3A and 3B. Network cloud 260 generally represents one or more interconnected networks, over which various systems and hosts described herein may communicate. Network cloud 260 may include packet-based wide area networks (such as the Internet), private networks, wireless networks, satellite networks, cellular networks, paging networks, and the like. As FIG. 2 illustrates, particular embodiments may operate in conjunction with a network environment comprising social network environment 220 and client devices 230, as well as, in some embodiments, one or more third party web application servers 240 or one or more enterprise servers 250. Client devices 230, web application servers 240, and enterprise servers 250 may be operably connected to the network environment and network cloud 260 via a network service provider, a wireless carrier, a set of routers or networking switches, or any other suitable means.

Figure 3A:
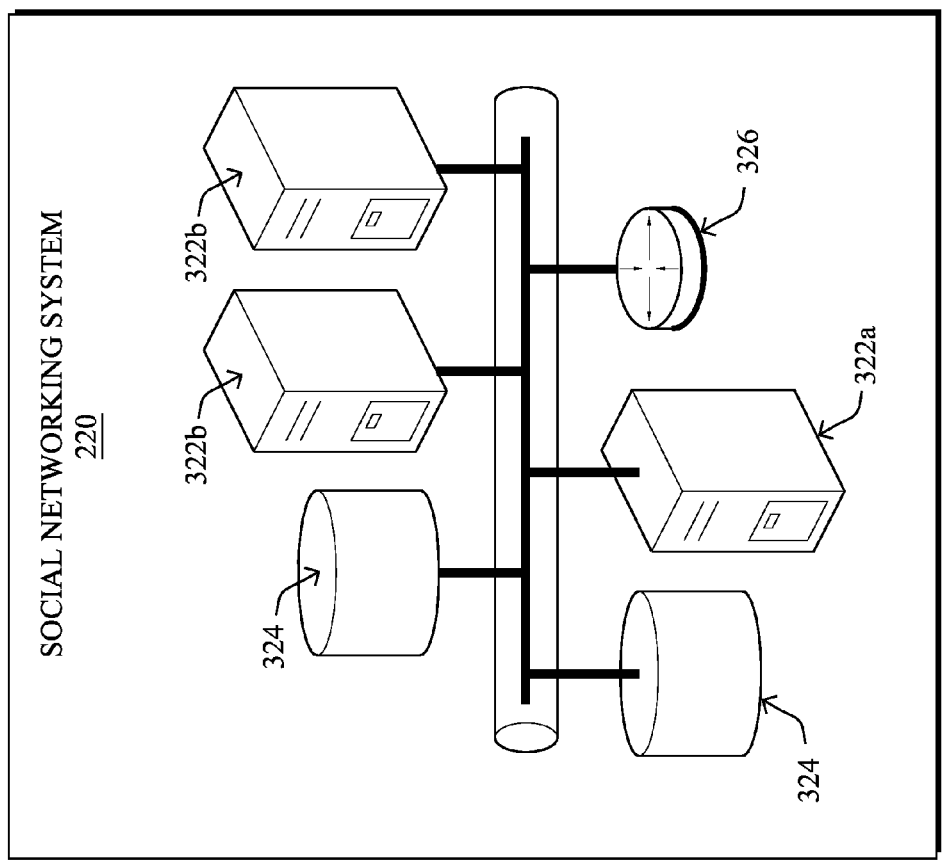
FIGS. 3A-3B illustrate example details of the network environment in FIG. 2.
Figure 3B:
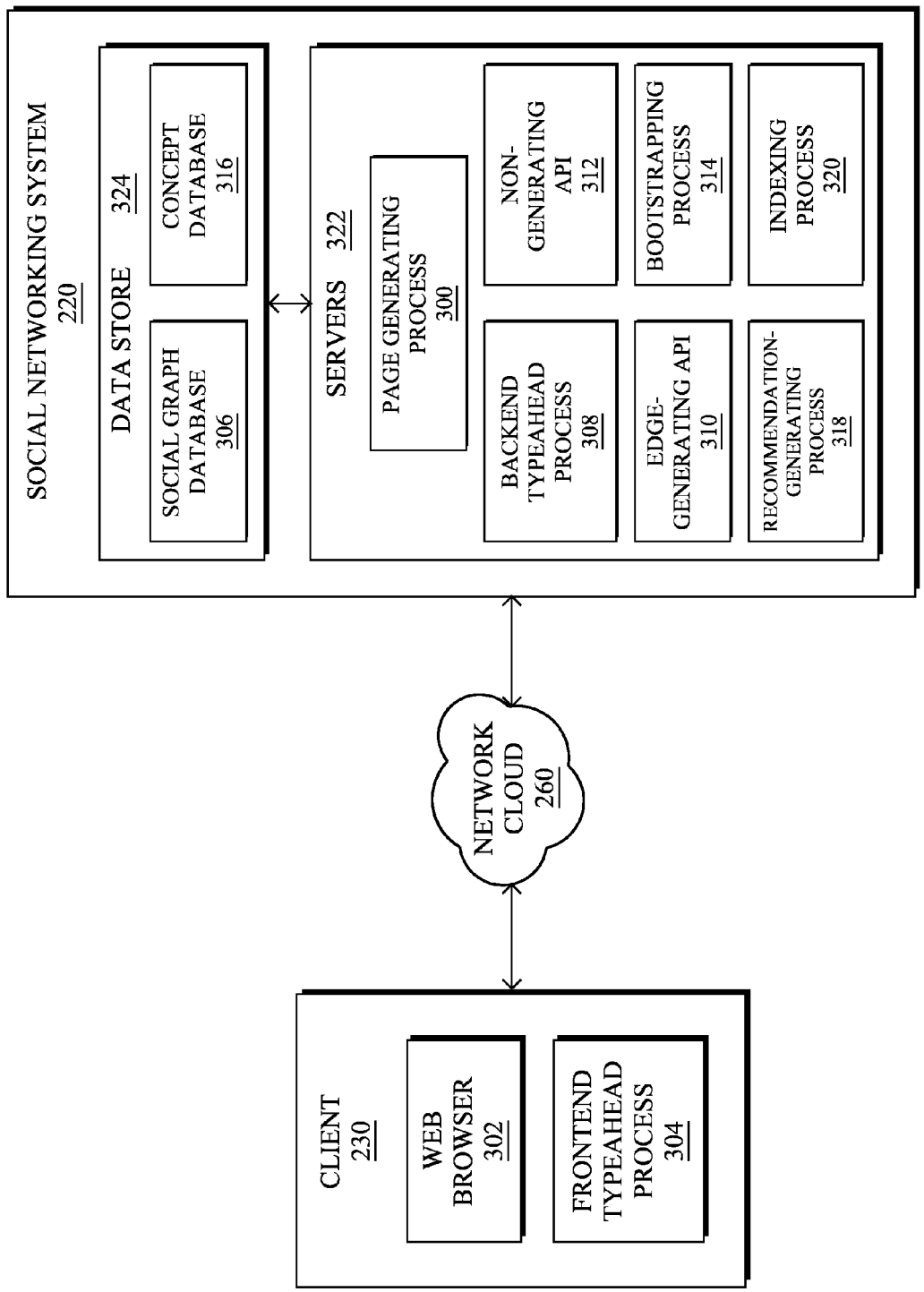

Each client device 230, web application server 240, or enterprise server 250 may generally be a computer, computing system, or computing device including functionality for communicating (e.g., remotely) over a computer network. Client device 230 in particular may be a desktop computer, laptop computer, personal digital assistant (PDA), is in- or out-of-car navigation system, smart phone or other cellular or mobile device, or mobile gaming device, among other suitable computing devices. Client device 230 may execute one or more client applications, such as a web browser (e.g., MICROSOFT WINDOWS INTERNET EXPLORER, MOZILLA FIREFOX, APPLE SAFARI, GOOGLE CHROME, etc.) (web browser 302 as illustrated in FIG. 3B below), to access and view content over a computer network 260. In particular implementations, the client applications allow a user of client device 230 to enter addresses of specific network resources to be retrieved, such as resources hosted by social network environment 220, web application servers 240, or enterprise servers 250. These addresses can be Uniform Resource Locators (URLs). In addition, once a page or other resource has been retrieved, the client applications may provide access to other pages or records when the user "clicks" on hyperlinks to other resources. By way of example, such hyperlinks may be located within the web pages and provide an automated way for the user to enter the URL of another page and to retrieve that page.

More particularly, when a user at a client device 230 desires to view a particular web page (hereinafter also referred to as a target structured document) hosted by social network environment 220, or a web application hosted by a web application server 240 and made available in conjunction with social network environment 220, the user's web browser 302, or other client-side structured document rendering engine or suitable client application, formulates and transmits a request to social network environment 220. The request generally includes a URL or other document identifier as well as metadata or other information. By way of example, the request may include information identifying the user, such as a user ID, as well as information identifying or characterizing the web browser 302 or operating system running on the user's client computing device 230. The request may also include location information identifying a geographic location of the user's client device or a logical network location of the user's client device, as well as timestamp identifying when the request was transmitted.

In an example implementation, when a request for a web page or structured document hosted by social network environment 220 is received by the social network environment 220, one or more page-generating processes (300 in FIG. 3B) executing is within the social network environment 220 typically generate a base web page in the form of a Hyper Text Markup Language (HTML), Extensible Markup Language (XML), or other web browser-supported structured document. The generated structured document is then transmitted in a response, which may comprise one or more portions or partial responses, to the requesting client 230 via a Hypertext Transfer Protocol (HTTP) or other suitable connection for rendering by the web browser 302 at the client device 230. The structured document may include one or more resources (e.g. JavaScript scripts, code segments, or resources, Cascading Style Sheet (CSS) code segments or resources, image data or resources, video data or resources, etc.), or references to such resources, embedded within the transmitted document. By way of example, a resource embedded in an HTML document may generally be included or specified within a script element, image element, or object element, among others, depending on the type of resource. The element referencing or specifying the resource may include a source attribute (e.g., src) identifying a location of the resource, which may be within a server or data store within social network environment 220 or at one or more external locations, to the client device 230 requesting the web page. Typically, upon receipt of the response, the web browser 302 or other client document rendering application running at the client device 230 then constructs a document object model (DOM) representation of the received structured document and requests the resource(s) (which may be at one or more other external locations) embedded in the document.

In an example implementation, when a registered user of social network environment 220 first requests a web page from social network environment 220 in a given user session, the response transmitted to the user's client device 230 from social network environment 220 may include a structured document generated by page-generating process 300 for rendering a login page at the client device. The user may then enter his or her user login credentials (e.g., user ID and password), which are then transmitted from the user's client device 230 to social network environment 220. Upon successful authentication of the user, social network environment 220 may then transmit a response to the user's web browser 302 at the user's client device 230 that includes a structured document generated by page-generating process 300 for rendering a user homepage or user profile page at the user's client device. Furthermore, in particular embodiments, and as will be described below, this or a subsequent response may further include one or more executable code segments (e.g., JavaScript) that, when received by the user's client device 230, implement a front-end (client-side) typeahead process 304 that executes in conjunction with the user's web browser 302.

In one example embodiment, social network environment 220 comprises computing systems that allow users at client devices 230 to communicate or otherwise interact with each other and access content, such as user profiles, as described herein. Social network environment 220 is a network addressable system that, in various example embodiments, comprises one or more physical servers 322a or 322b (hereinafter also referred to collectively as servers 322) as well as one or more data stores collectively referred to herein as data store 324 (which may be implemented in or by one or more of a variety of consolidated or distributed computing systems, databases, or data servers), as illustrated in FIG. 3A. The one or more physical servers 322 are operably connected to computer network 260 via, by way of example, a set of routers or networking switches 326. In an example embodiment, the functionality hosted by the one or more physical servers 222 may include web or HTTP servers, FTP servers, as well as, without limitation, web pages and applications implemented using Common Gateway Interface (CGI) script, PHP Hypertext Preprocessor (PHP), Active Server Pages (ASP), Hyper Text Markup Language (HTML), Extensible Markup Language (XML), Java, JavaScript, Asynchronous JavaScript and XML (AJAX), and the like.

Physical servers 322 may host functionality directed to the operations of social network environment 220. By way of example, social network environment 220 may host a website that allows one or more users, at one or more client devices 230, to view and post information, as well as communicate with one another via the website. Hereinafter, servers 322 may be referred to as server 322, although, as just described, server 322 may include numerous servers hosting, for example, social network environment 220, as well as other content distribution servers, data stores, or databases. Data store 324 may store content and data relating to, and enabling, operation of the social network environment as digital data objects including content objects. A data object, in a particular implementation, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 324 corresponds to one or more of a variety of separate or integrated databases, such as relational databases and object-oriented databases, that maintain information as an integrated collection of logically related records or files stored on one or more physical systems. Structurally, data store 324 may generally include one or more of a large class of data storage and management systems. In particular embodiments, data store 324 may be implemented by any suitable physical system(s) including components, such as one or more database servers, mass storage media, media library systems, storage area networks, data storage clouds, and the like. In one example embodiment, data store 324 includes one or more servers, databases (e.g., MySQL), and/or data warehouses.

Data store 324 may include data associated with different social network environment 220 users, client devices 230, web application servers 240, or enterprise servers 250, as well as, in particular embodiments, data associated with various concepts. As described above, particular embodiments relate to a social network environment 220 that includes a platform enabling an integrated social network environment. In the following example embodiments, the social network environment may be described or implemented in terms of a social graph including social graph information. In particular embodiments, data store 324 includes a social graph database 306 in which the social graph information for use in implementing the social network environment described herein is stored. In particular embodiments, the social graph information stored by social network environment 220 in data store 324, and particularly in social graph database 306, includes a plurality of nodes and a plurality of edges that define connections between corresponding nodes. In particular embodiments, the nodes or edges themselves are data objects that include the identifiers, attributes, and information (including the information is for their corresponding profile pages) for their corresponding users or concepts (as described below), some of which is actually rendered on corresponding profile or other pages. The nodes may also include pointers or references to other objects, data structures, or resources for use in rendering content in conjunction with the rendering of the profile pages corresponding to the respective nodes.

Figure 4:
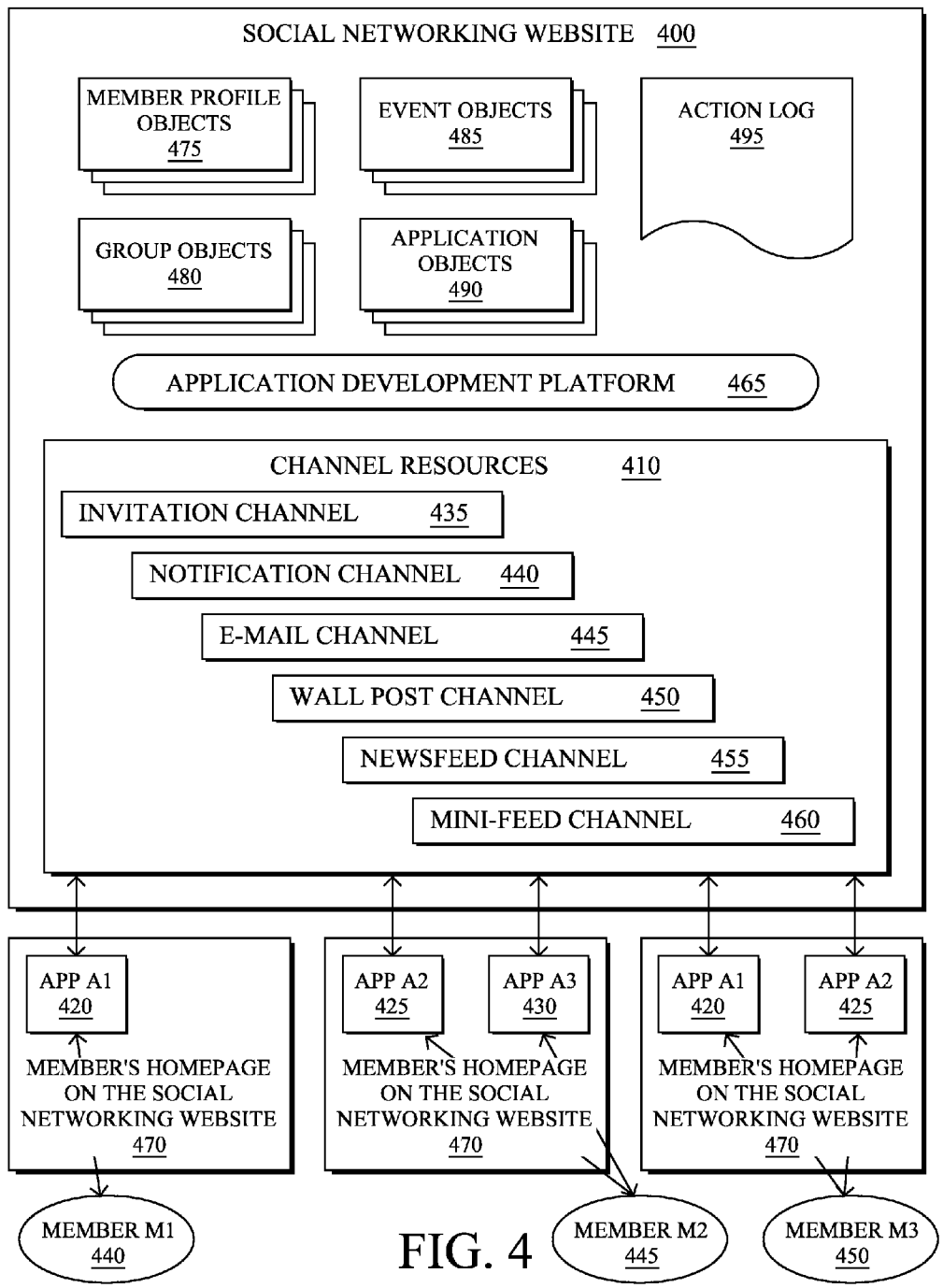
FIG. 4 illustrates an example configuration of a social networking website.

In general, there are various mechanisms available to members to communicate with each other or to obtain information that they find interesting such as activities that their friends are involved with, applications that their friends are installing, comments made by friends on activities of other friends etc. The mechanisms of communication between members are called channels available as resources. A channel is a computer mediated communication mechanism for facilitating communication between users of the social network and the social network. As illustrated in FIG. 4, the following channels are available to users of a social networking website 400 in one embodiment: Invitation Channel 435: An invitation is a message sent by a member inviting another member to do something e.g., a member can invite his friend to install an application. Notification Channel 440: A notification is a message informing a member that some activity involving the member has occurred on the social network. Email Channel 445: Members can communicate by emails. Wall Post Channel 450: A wall is an application that allows members to write interesting information to be shared between friends. A message written to a member's wall is called a wall post. A member can post on his own wall, as well as walls of the member's friends. Any friend of a member can see what is written on his wall. Newsfeed Channel 455: newsfeed is a constantly updated list of activities done by friends of a member. Such activities include adding applications, commenting on photos, making new friends etc. Mini-feed Channel 460: The mini-feed of a member is a list of actions taken by that member. For example, the member may have added new friends to his social network or installed certain applications. All such activities of a member are listed in the mini-feed of that member.

In addition to interactions with other members, the social networking website provides members with the ability to take actions on various types of items supported by the website. These items may include groups or networks (where "networks" here refer is not to physical communication networks, but rather to social networks of people) to which members of the website may belong, events or calendar entries in which a member might be interested, computer-based applications that a member may use via the website, and transactions that allow members to buy, sell, auction, rent, or exchange items via the website. These are just a few examples of the items upon which a member may act on a social networking website, and many others are possible.

As illustrated in FIG. 4, the social networking website 400 maintains a number of objects for the different kinds of items with which a member may interact on the website 400. In one example embodiment, these objects include member profiles 475, group objects 480, event objects 485, application objects 490 (respectively, hereinafter, groups 480, events 485, and applications 490). In one embodiment, an object is stored by the website 400 for each instance of its associated item. For example, a member profile 475 is stored for each member who joins the website 400, a group 480 is stored for each group defined in the website 400, and so on. The types of objects and the data stored for each is described in more detail below in connection with FIG. 4.

The member of the website 400 may take specific actions on the website 400, where each action is associated with one or more objects. The types of actions that a member may perform in connection with an object is defined for each object and largely depends on the type of item represented by the object. A particular action may be associated with multiple objects. Described below are a number of examples of particular types of objects that may be defined for the social networking website 400, as well as a number of actions that can be taken for each object. These objects and the actions discussed herein are provided for illustration purposes only, and it can be appreciated that an unlimited number of variations and features can be provided on a social networking website 400.

The social networking website 400 maintains a member profile 475 for each member of the website 400. Any action that a particular member takes with respect to another member is associated with each member's profile 475, through information maintained in a database or other data repository, such as the action log 495. Such actions is may include, for example, adding a connection to the other member, sending a message to the other member, reading a message from the other member, viewing content associated with the other member, attending an event posted by another member, among others. In addition, a number of actions described below in connection with other objects are directed at particular members, so these actions are associated with those members as well.

A group 480 may be defined for a group or network of members. For example, a member may define a group to be a fan club for a particular band. The website 400 would maintain a group 480 for that fan club, which might include information about the band, media content (e.g., songs or music videos) by the band, and discussion boards on which members of the group can comment about the band. Accordingly, member actions that are possible with respect to a group 480 might include joining the group, viewing the content, listening to songs, watching videos, and posting a message on the discussion board.

Similarly, an event 485 may be defined for a particular event, such as a birthday party. A member may create the event 485 by defining information about the event such as the time and place and a list of invitees. Other members may accept the invitation, comment about the event, post their own content (e.g., pictures from the event), and perform any other actions enabled by the website 400 for the event 485. Accordingly, the creator of the event 485 as well as the invitees for the event may perform various actions that are associated with that event 485.

The social networking website 400 also enables members to add applications to their profiles. These applications provide enhanced content and interactivity within the social networking website 400, which maintains an application object 490 for each application hosted in the system. The applications may be provided by the website operator and/or by third party developers. An example application is an enhanced messaging service, in which members can send virtual objects (such as a "gift" or "flowers") and an optional message to another member. The use of any functionality is offered by the application may thus constitute an action by the member in connection with the application 490. In addition, continuing the example from above, the receipt of the virtual gift or message may also be considered an action in connection with the application 490. It can therefore be appreciated that actions may be passive and need not require active participation by a member. The scope and type of applications provided is limited only by the imagination and creativity of the application developers. Applications are generally written as server-side code that is run on servers of the social networking website 400; an application may also use client-side code as appropriate. Generally, when a user logs into the site, the system determines which applications the user has installed (e.g., registered for) and then loads and runs such applications in combination with the underlying functionality of the social networking website.

As illustrated in FIG. 4, each member can select which applications to install and run. For example, application A1 420 is installed by member M1 440 and member M3 450 but not by member M2 445. Social networking websites that allow third party developers to develop applications provide a platform 465 for developing new applications. The platform 465 generally includes an application programming interface (API) by which applications can request various types of functions from the social network website 400, such as information pertaining to a user (e.g., information about a user's profile, or a user's friends), as well as functions for accessing the channel resources 410. The availability of a large number of applications is beneficial for such a social networking website because users are likely to visit the website repeatedly to make use of the functionality provided by the applications. A member can choose to uninstall an application installed by the member at any time.

Figure 5:
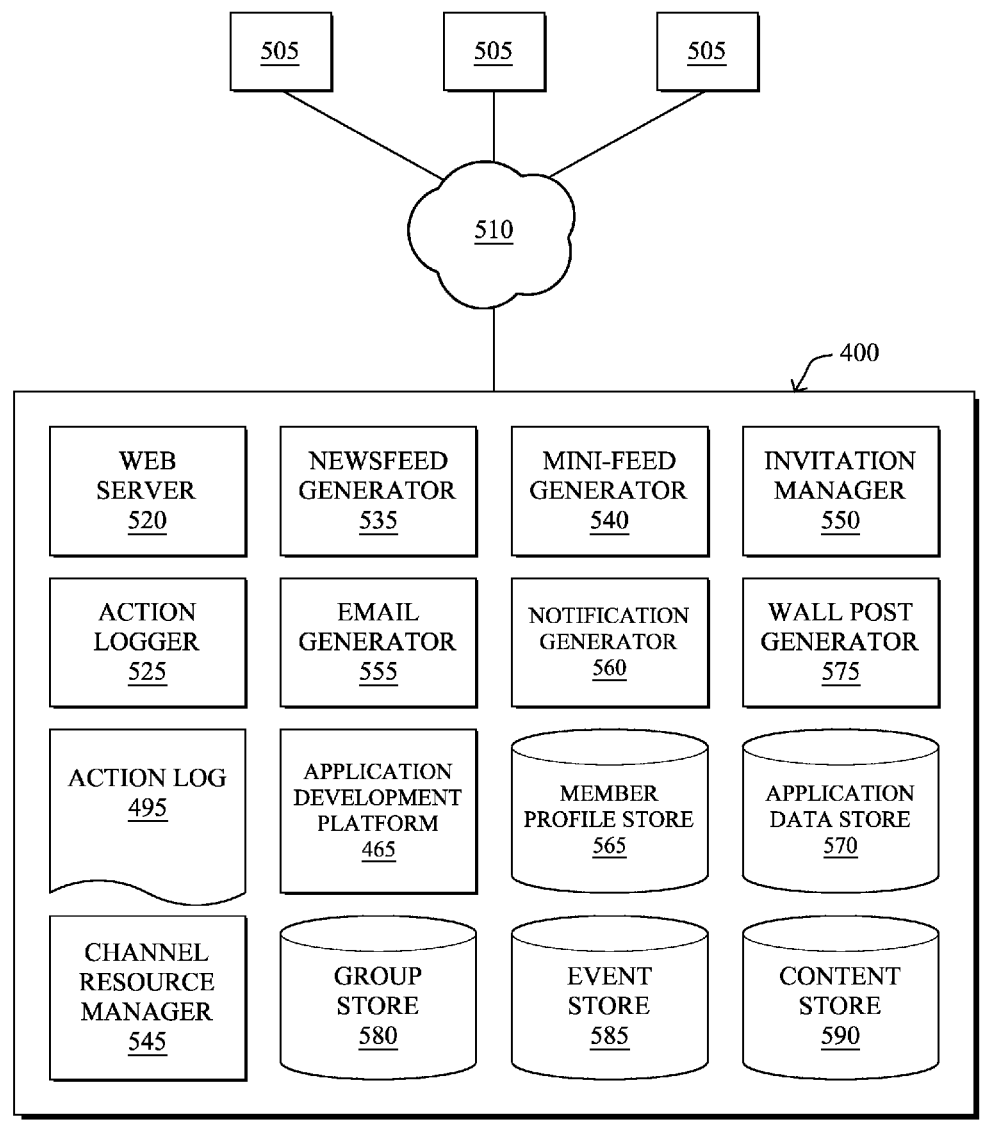
FIG. 5 illustrates a high level block diagram of a system environment suitable for operation of the social networking website in FIG. 4.

In relation to FIG. 4, FIG. 5 is a high level block diagram illustrating a system environment suitable for operation of a social networking website 400. The system environment comprises one or more client devices 505, a social networking website 400, and a network 510. In alternative configurations, different and/or additional modules can be included in the system.

The client devices 505 comprise one or more computing devices that can receive member input and can transmit and receive data via the network 510. For example, the is client devices 505 may be desktop computers, laptop computers, smart phones, personal digital assistants (PDAs), or any other device including computing functionality and data communication capabilities. The client devices 505 are configured to communicate via network 510, which may comprise any combination of local area and/or wide area networks, using both wired and wireless communication systems.

The social networking website 400 comprises a computing system that allows members to communicate or otherwise interact with each other and access content as described herein. The social networking website 400 stores member profiles that describe the members of a social network, including biographic, demographic, and other types of descriptive information, such as work experience, educational history, hobbies or preferences, location, and the like. The website 400 further stores data describing one or more relationships between different members. The relationship information may indicate members who have similar or common work experience, group memberships, hobbies, or educational history. Additionally, the social network host site 400 includes member-defined relationships between different members, allowing members to specify their relationships with other members. For example, these member defined relationships allows members to generate relationships with other members that parallel the members' real-life relationships, such as friends, co-workers, partners, and so forth. Members may select from predefined types of relationships, or define their own relationship types as needed.

FIG. 5 contains a block diagram of the social networking website 400. The social networking website 400 includes a web server 520, an action logger 525, an action log 495, a newsfeed generator 535, a mini-feed generator 540, a channel resource manager 545, an invitation manager 550, an email generator 555, a notification generator 560, a wall post generator 575, an application development platform 465, a member profile store 565, an application data store 570, a group store 580, an event store 585, and a content store 590. In other embodiments, the social networking website 400 may include additional, fewer, or different modules for various applications. Conventional components such as network interfaces, security mechanisms, load balancers, failover servers, management and network operations consoles, and the like are not shown so as to not obscure the details of the system.

The web server 520 links the social networking website 400 via the network 510 to one or more client devices 505; the web server 520 serves web pages, as well as other web-related content, such as Java, Flash, XML, and so forth. The web server 520 may include a mail server or other messaging functionality for receiving and routing messages between the social networking website 400 and the client devices 510. The messages can be instant messages, queued messages (e.g., email), text and SMS messages, or any other suitable messaging technique.

The action logger 525 is capable of receiving communications from the web server 520 about member actions on and/or off the social networking website 400. The action logger 525 populates the action log 495 with information about member actions to track them. The newsfeed generator 535 generates messages for each member about information that may be relevant to the member, based on actions stored in the action log 495. These messages are called "stories"; each story is an message comprising one or a few lines of information based on one more actions in the action log that are relevant to the particular member. The stories are presented to a member via one or more pages of the social networking website 400, for example in each member's home page or newsfeed page as shown in FIG. 5. The mini-feed generator 540 generates messages for each member about actions done by that member. Similar to newsfeed communications, these communications are also stories but mini-feed stories of a member are based only on actions done by that member. The channel resource manager 545 allocates channel resources to different applications. The invitation manager 550 controls how many invitations an application is allowed to send. The email generator 555 generates emails for members based on activities associated with the member's friends. For example, the use of a specific application by the member's friend may cause an email to be sent to the member. The notification generator 560 generates notification messages for a member informing the member about activities that happened on the social networking website related to that member. For example, a notification may inform a member that a friend is posted a message on the member's wall. The wall post generator 575 generates wall post messages for members. For example, a message about a new application being available may be posted on a member's wall.

As discussed above, the social networking website 400 maintains data about a number of different types of objects with which a member may interact on the website 400. To this end, each of the member profile store 565, application data store 570, the group store 580, the event store 585, and the content store 590 stores instances of the corresponding type of object maintained by the website 400. Each object type has information fields that are suitable for the storing information appropriate to the type of object. For example, the event store 585 contains data structures that include the time and location for an event, whereas the member profile store 565 contains data structures with fields suitable for describing a member's profile. When a new object of a particular type is created, the website 400 initializes a new data structure of the corresponding type, assigns a unique object identifier to it, and begins to add data to the object as needed. This might occur, for example, when a member defines a new event, wherein the website 400 would generate a new instance of an event in the event store 585, assign a unique identifier to the event, and begin to populate the fields of the event with information provided by the member.

Online Community Advocacy Management Platform

As noted above, online social media websites often allow users to "like" or share content, such as user-generated content (social events, random chatter) or brand-sponsored material, such as products, sales, etc. Users are also allowed to follow various pages, such as friends or brands, and may post content on their walls. What is currently lacking in such a model, however, is an intelligent mechanism to track and promote advocacy among users, particularly with regard to brands (products, companies, businesses, movies, sports teams, events, etc.). For instance, though a high percentage of a brand's fans consider themselves brand advocates, in actuality only a small percentage are truly advocating or promoting the brand beyond merely "liking" its social media page.

The techniques herein provide an online community advocacy management is platform that helps brands (or users in general) to identify the advocates within their fan base that promote the brand to their friends and with other brand enthusiasts. In particular, the techniques herein engage these advocates by letting them create, vote, and share rich content (e.g., ideas and stories) about a particular brand with other advocates or fans, as well as within their own social networks. For example, brands (or the advocates themselves) can create engaging topics that brand fans and their friends can interact with, either directly on the social media website or else in a brand-specific app, thereby creating a brand community. Through their actions, advocates are given the credit for their advocacy by building permanent reputations within the brand's fan community, giving these advocates a reason to continue promoting the brand, thus exposing the brand to their social network as a trusted source. That is, fans/advocates build permanent identities based on their contributions, "level up" as their reputations grow, and foster great peer relationships within the brand community, making the brand community a worthwhile user experience.

Moreover, the techniques herein provide brand administrators intelligent insights into the content, as well as the top advocates that drive conversation about the brand. For instance, the techniques herein gauge enthusiasm and fan-to-friend influence happening within the fan communities. For example, the techniques herein manage an overall "advocate retention" score for each user based on advocacy interaction, in terms of volume, frequency, and/or value, which may gauge whether the users will re-engage in the future. Advantageously, knowing that a core minority drive almost all communities, the behavior of these "superfans" is a very predictive indicator on performance of a community to influence behavior of fans as well as friends of fans.

According to one or more embodiments described herein, within an online social community (e.g., FACEBOOK, MYSPACE, etc.), brands (e.g., companies, businesses, sports teams, etc.) are provided with tools to connect with users (e.g., advocates, audience, customers) in a manner that allows them to evaluate and promote content generated by or in collaboration with users based on "buzz". The techniques herein, is implemented as an app, tab, or plug-in to a social media site, provide user interface and back-end mechanisms to identify people over time in a community-up (not content-down) manner that weights current actions based on the accumulated value of past actions of all involved users, such as by granting users levels of advocacy points/badges for creating or curating content (e.g., brand "plugs" or other content) that drive response and action from the audience, with immediate social validation. Value is measured algorithmically based on the first and second tier activities driven by a user action. In this manner, the techniques herein provide the capability to tie actions to users across time, and to understand their historic influence, likely future influence, while providing incentives that drive users to become influential advocates.

Figure 6:
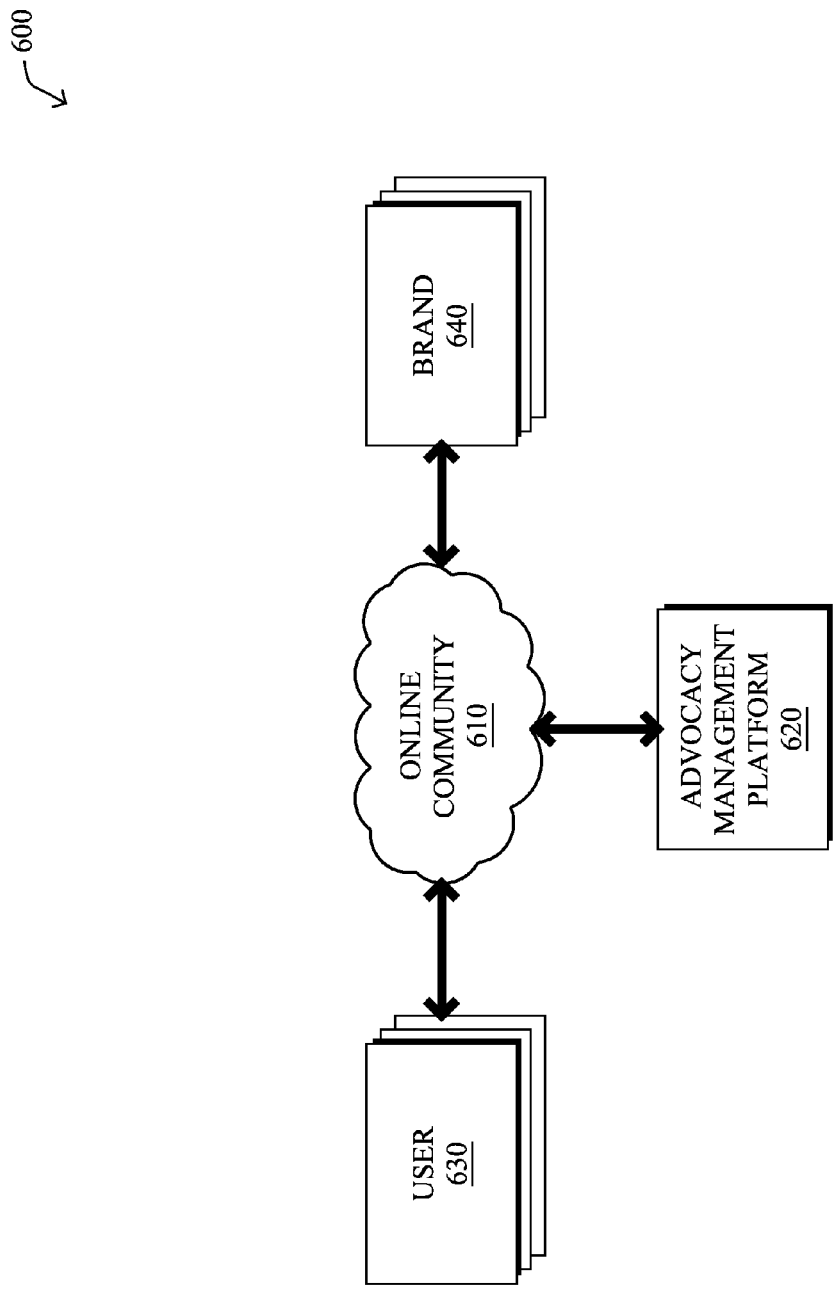
FIG. 6 illustrates an example online community advocacy management platform.

FIG. 6 illustrates an example simplified system 600 in which an online community advocacy management platform 620 may operate. In particular, an online community 610, such as a social media website where users/participants 630 can come together to share content, may also be utilized by one or more brands 640 to reach out to those users with specifically generated content, as described herein. (Note that as used herein, a "brand" is generally used to reference a particular user/member of a community that represents a given company, business, sports team, etc., such as an administrator or moderator) Through interaction with the advocacy management platform 620, the brands may evaluate content based on buzz, identifying people over time as advocates within a targeted audience, and quantifying advocate retention and their ability to create useful (socially validated) content. Note that the online community 610 may be a generic forum for all user-based activity, or may be brand-specific. The view shown herein is simplified for discussion, and is not meant to limit the scope of the disclosure.

In general, those skilled in the art will readily understand the basic concept of an online community, and how the online community may be a side-page or app (e.g., fan page) controlled or offered by the advocacy management platform 620 that executes within a social media environment (e.g., FACEBOOK) or else as the social media environment itself (e.g., an independent website). In some cases, the users 630 may simply access the online community within a social media environment, or may be required to "allow" an app to execute on their local machines (computer, laptop, phone, tablet, etc.) in order to access the community 610. In other words, wherein the "platform" 620 itself may refer to an application within a social media website, a plug-in for a social media website, a feature of a social media website, a tab of a social media website, the actual social media website, a program offered to brands for use within a social media website, etc.

Accordingly, the online community advocacy management platform may generally provide a forum for user-generated content, which may be a topic-specific social media wall and/or a personal user-centric social media wall. Note that the forum may also be brand-specific, or may be a more generic forum allowing cross-brand discussion (e.g., a rock climbing forum, an auto-enthusiast forum, etc.). The forum may be used to present various administrator-created topics that specifically solicit user-generated content, such as questions, topics, subjects, etc. (e.g., "what's your favorite memory of the brand?" or "who should win this year's most valuable player award?").

Figure 7:
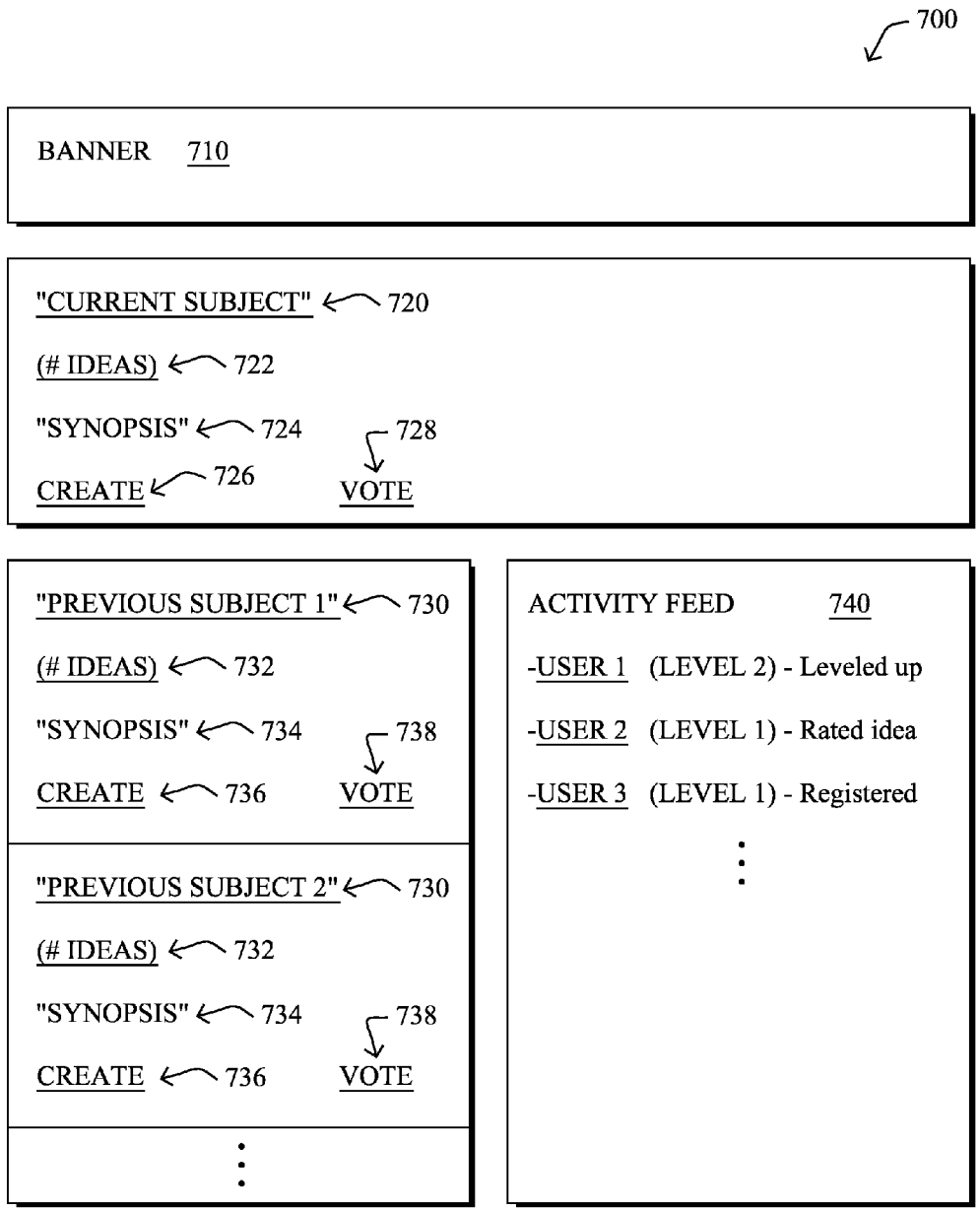
FIG. 7 illustrates an example user interface relating to accessing topics in an online community advocacy management platform.

FIGS. 7-12 illustrate example simplified user interfaces of various web pages provided by/presented by the online community advocacy management platform 620 within the online community 610. (Note that FIGS. 7-12 are merely example implementations, and are not meant to be limiting to the scope of the embodiments herein.) For instance, FIG. 7 illustrates an example user interface 700 relating to accessing topics in an online community advocacy management platform. Illustratively, a particular brand may present some banner graphic 710 (e.g., an image or slogan associated with the brand), and solicits user-generated content through a "current subject" 720, such as "name your favorite dinner dish". Users may see a number (#) of ideas already presented (link 722), and text relating to a synopsis 724 of the idea, such as "Hey fans! We're looking to see what is your favorite dinner dish, past or present!" Users may then select the link 726 to create a new idea, or link 728 to vote on current ideas, and may be brought to FIG. 8, described below. Still within FIG. 7, users may still be able to access previous subjects 730, each with an associated number of ideas 732, synopsis 734, and create and vote buttons/links (736/738). In one or more embodiments, an activity feed 740 may also be presented, which may be used to display recent activities such as is user promotions (leveling up), user posts, user actions, etc., where users may select particular user names to gain further insight into the activity, such as being brought to a subject-specific website/interface or to a user profile page, etc.

Figure 8:
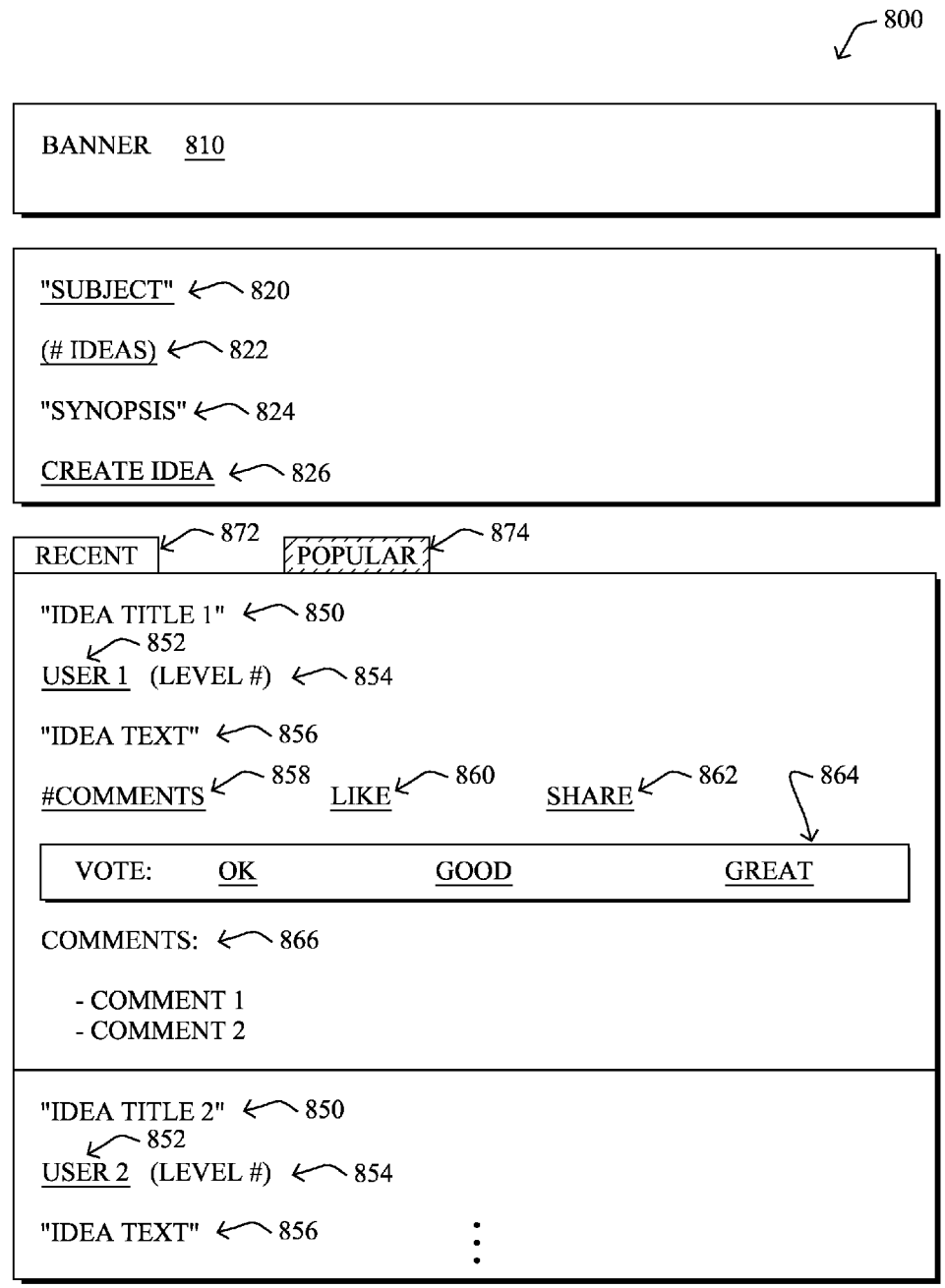
FIG. 8 illustrates an example user interface relating to a specific topic in an online is community advocacy management platform.

Once a user has opted to view a particular subject (current 720 or previous 730), they may be brought to a subject-specific user interface 800 as shown in FIG. 8, which illustrates an example user interface relating to a specific topic in an online community advocacy management platform. Specifically, a banner 810, which may be the same as banner 710, may be presented to the user to continue to identify with the brand or online community in general. The selected subject 820 may again be presented with the number of ideas 822, the synopsis 824 (which may, though need not be, the same as synopsis 724/734) and an option to create a new idea 826. Illustratively below the subject listing 820, a participant may find a listing of the user-generated content, such as specific ideas 850 (e.g., "the steak tip dinner is my favorite dish!") presented by identified users 852 (e.g., a user name, a handle, a user ID, an avatar, etc.) having an associated level 854, described herein. The author-users may also provide a string of idea text 856 (e.g., "I ask for it medium-rare, and with extra sauce. Can't beat it!") associated with their idea 850, and participants may see or contribute to comments 866 (e.g., by clicking link 858), or may simply like (link 860) or share (link 862) the content, as will be understood in the art. Note that the participants may also vote on the idea 850 (link/buttons 864), which is another mechanism that may help a brand and the author gauge community response to the user-generated idea 850.

In particular, the techniques herein may be used to determine a community response to a particular user-generated content in a forum, such as based on follow-on social input (e.g., comments, links, votes, followers, shares, etc.) associated with the particular user-generated content. From the community response, the techniques herein may thus evaluate an influence of the particular user-generated content, or else provide metrics for administrator evaluation of the content, as described herein. Note that the social input may also consider first and second tier responses, where a first tier response is associated with the user-generated content (e.g., a comment or a share by a first user of the original idea 850) and a second tier response is associated with the first tier responses (e.g., a comment or like by a second user of the first user's comment or share).

Figure 9:
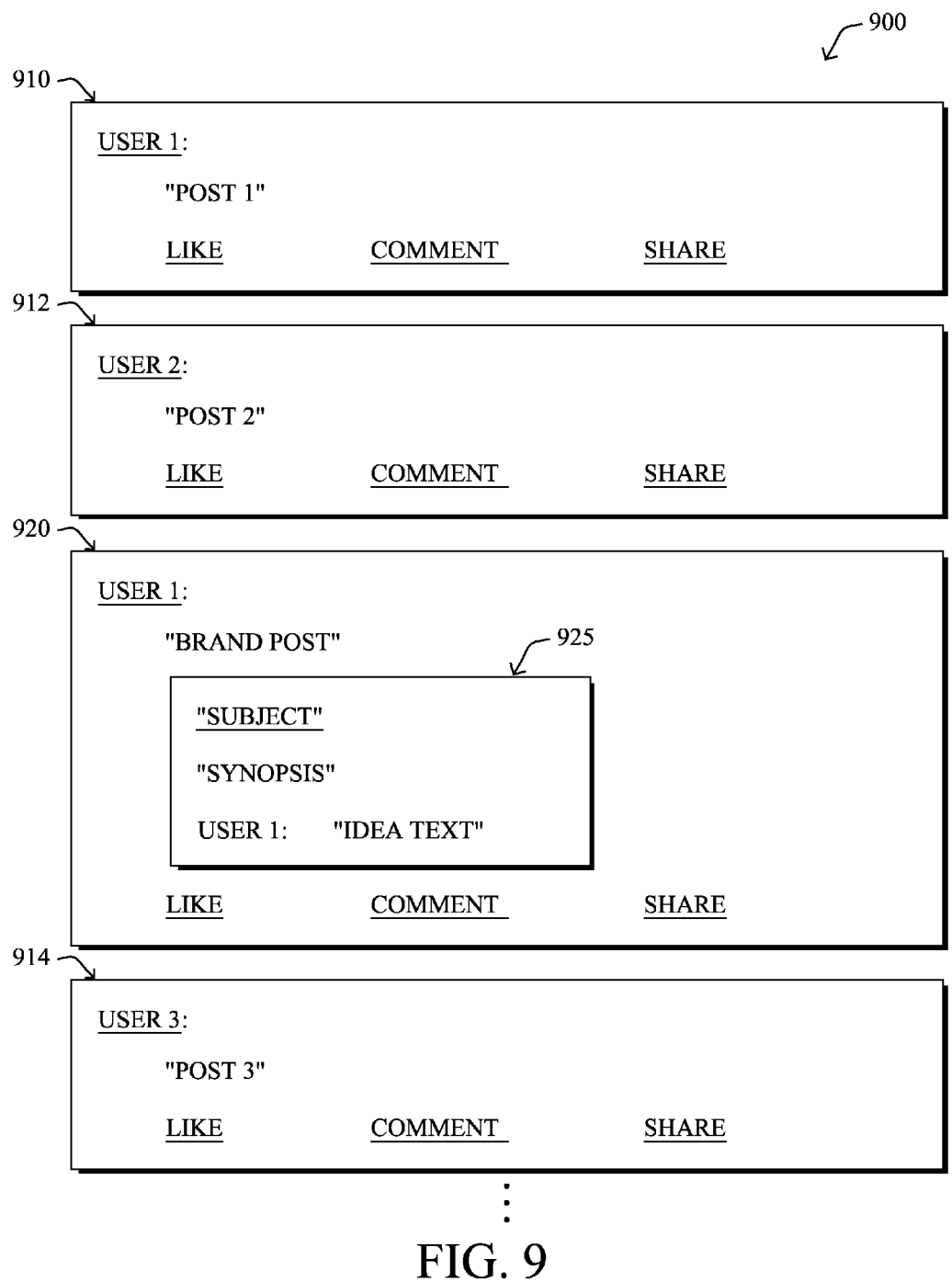
FIG. 9 illustrates an example user interface relating to a user's wall in a social networking website.

FIG. 9 illustrates another example user interface which relates to a user's wall in a social networking website. In particular, the user interface 900 may represent a user's wall or else a newsfeed presented to a user, where various posts 910, 912, and 914 may be presented by various associated users, such as pictures, comments, random ramblings, etc. Post 920, specifically, may be a brand-related post, which may contain a link or shared posting 925 of a subject as described above in relation to FIGS. 7 and 8 above. Note that the posting 920 (or link 925) may be directly input into the wall/newsfeed 900 and may be associated with the particular brand, or else may be inserted into and shared between the wall/newsfeed 900 and one of the other user interfaces 700/800 above.

Specifically, the online community advocacy management platform herein may be configured to provide cross-platform content management, where the techniques herein (e.g., application programming interfaces (APIs)) pull (and/or push) comments in from the app/plug-in, and cross-pollinate the social online community (e.g., social network website walls) and app/plug-in content in an intelligent manner (which content, how often, etc.). For instance, social media environments/websites (e.g., hosting the personal user-centric social media wall) often provide tools for API integration, such as FACEBOOK's Open Graph API, from which the platform 620 herein may access raw social media data (get content, query data, etc.), aggregate it, and intelligently distil the data for use with the techniques herein.

In particular, according to one or more embodiments herein, the online community advocacy management platform may maintain a topic-specific social media wall (e.g., interface 800) within an online community, and may detect a correlation, for a user-generated post, between the topic-specific social media wall and a personal user-centric social media wall. For instance, the platform 620 may detect/determine that a particular user (e.g., user1) participates in both the online community, and also has a personal user-centric social media wall 900. As such, in one embodiment, the user may post user-generated content within the online community (e.g., "Idea Title 1" 850 by user1) in FIG. 8), and that post may be pulled from the online community (page 800) to is the user-centric social media wall 900 (e.g., post 920 and/or content 925 entered into the user's wall and/or profile). Alternatively or in addition, in another embodiment, the user may post user-generated content on the personal user-centric social media wall 900, and the techniques herein push the content (e.g., post content 925) to the online community.

In either situation above, the techniques herein also notably pull or push social input related to the user-generated post between the topic-specific social media wall and the personal user-centric social media wall as described herein. In particular, at least when pulling social input (e.g., likes, comments, votes, shares, flags, etc.) related to the user-generated post from the personal user-centric social media wall into the topic-specific social media wall, the techniques herein may select particular social input, and may do so at a determined rate. For instance, the techniques herein may select the selected social input as social input from participants registered with the online community, or as social input from participants having a user advocacy score (described herein) within the online community that is greater than a minimum threshold. Further, the techniques herein may provide for a manual moderation queue, where an administrator (or user with a sufficient advocate level, described herein) may moderate and approve the cross-pollination of the content. Alternatively or in addition, the techniques may selectively pull (or push) content and/or social input based on "buzz", such as pulling content that has been liked or shared a sufficient number of times, or voted highly, or greatly commented upon, etc., such that content with a sufficient level of first tier social input, or first tier social input with a sufficient level of secondary tier input, may be selected for cross-pollination.

In certain embodiments, the rate at which content is cross-pollinated (pulled and/or pushed) may be a default time (e.g., generally instantaneous, once an hour, once a day, etc.), or may be a dynamically determined rate. For instance, the rate may be determined as a default initial rate (e.g., every ten minutes), and then decayed to a longer rate over time (e.g., gradually increasing over 4-5 days to infinity to stop pulling social input). Note that in certain specific embodiments, the rate may be additionally or separately be determined as a function of community interest in the user-generated content, such as basing the rate on the number or rate (or both) of followers, likes, comments, votes, shares, flags, etc. For example, an active subject may continue to be active for many days, where such activity may be judged by continued interest and newly generated content.

Figure 10:
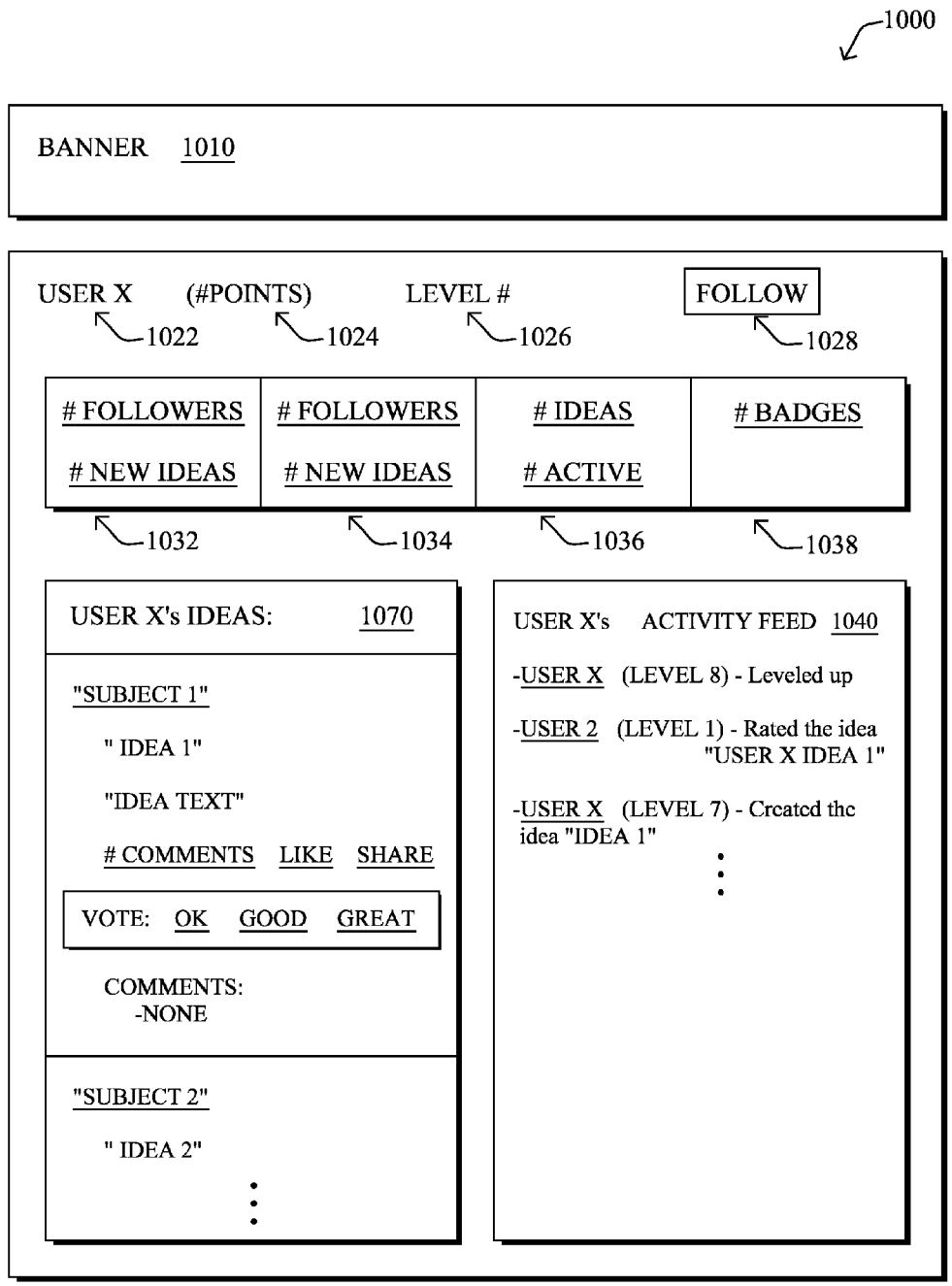
FIG. 10 illustrates an example user interface relating to a user's wall in an online community advocacy management platform.

Referring again to the user interfaces, FIG. 10 illustrates an example user interface 1000 relating to a user's wall in an online community advocacy management platform, for instance, a public wall that may be viewed by another participant (or the user his or herself), such as when clicking on the user's name in any of the other interfaces/pages above. (Note that the page 1000 may be used for both registered users as well as non-registered participants/users associated with a "ghost profile," as described below, e.g., as a uniquely identified anonymous user.) Illustratively, page 1000 may comprise a banner 1010 tying the profile to the online community, while a substantial remainder of the page is dedicated to the particular user 1022 ("User X") and their status, reputation, and contribution to the online community. For example, the user name 1022 may be associated with a number of points 1024 and a level 1026, each described below. Participants viewing the page/wall 1000 may also be given the option to follow (button/link 1028) the given User X, as may be appreciated by those skilled in the art.

Various views/options may be presented, such as the ability to see a number of followers (participants following User X) and their ideas (tab 1032), a number of users that User X is following and their ideas (tab 1034), a number of ideas and a number of active ideas (tab 1036, illustratively selected and shown), and a number of badges or achievements (tab 1038). Clicking any of the above-mentioned tabs may direct the participant to a listing of the followers, users being followed, their respective ideas, the types of badges/achievements (e.g., User X's profile, as discussed in FIG. 11 below), etc. As shown in FIG. 10, when the active ideas tab 1036 is selected, a participant may be shown one or more of User X's ideas 1070, with an illustrative layout similar to the subject/topic pages described above, though generally limited to ideas or other content sourced by User X. In addition, User X's activity feed 1040 may also be collected and shown within the interface 1000, such as indicating actions performed by User X, achievements reached, actions by other users with regard to User X, etc.

As mentioned above, the techniques herein also provide advocacy retention is scoring or other achievement-based award system for the online community advocacy management platform. In particular, in one or more embodiments herein, an advocacy retention score may be established to foster elite advocates by providing incentives for engaging in brand-generated communications such as the creation of comments, and creating peer-to-peer and reputation-based relationships specific to the context of that brand community. Various techniques are presented to define levels and badges (milestones) to allow users to maintain an advocate reputation based on participation and community response.

In particular, various activities may be associated with a certain number of correspondingly valuable "points" to award to the users according to their community participation. For instance, "small" activity, such as clicking "like", might be associated with a smaller number of points, while "large" activity, such as posting a new idea, might be associated with a correspondingly larger number of points. In general, the point system for the advocacy score may be established unilaterally by the advocacy management platform 620, or else by brands themselves for brand-specific online communities 610.

Specifically, the online community advocacy management platform 620 may determine participation of a user in an online community based on user activity, and also a community response to the user activity. Based on values associated with particular user activities and particular community responses, as mentioned above, a user advocacy score for the particular user that sourced the particular user-generated content may be adjusted within the online community. For example, an illustrative score generally weighs the rest of the community's response to a user's actions, rather than (or in addition to) the quantity of a user's action (e.g., creating a comment earns significantly less reputation than five other people liking (or up-voting or otherwise endorsing) a comment). Favorable downstream reactions to a user's action (purchase or convert, sign-up, increased frequency of engagement within community, etc.) may also be weighed. Note that the advocacy score may be adjusted based on an aggregate of historical influence of the particular user, which generally correlates to increasing the advocacy score in response to positive community response. However, in one or more embodiments, the advocacy score may actually be decreased in response to a negative community response, if so desired by system administrators.

The advocacy score of the users may then be provided to the particular user, community participants, community members, and administrators specifically soliciting content on the forum, whether in report form, or more preferably, within the online community pages as described herein. In this manner, the techniques herein allow users to build their identity within the community (e.g., becoming the brand's "#1 fan", or a top advocate), and allows the brands themselves to better track who are their best advocates, which advocates come back repeatedly, which ones return less frequently or not at all (e.g., "one-hit-wonders") through the reputation and persistent ID of the users, based on participation and community response.

In addition, to further foster elite advocates, the techniques herein provide mechanisms for additional incentives for user-generated content, such as defining a plurality of advocacy milestones for users, and providing recognition awards to the users in response to their reaching each advocacy milestone. For instance, the online community advocacy management platform (or else brand administrators) may establish a plurality of score-based level thresholds, such that a level of a particular user increases within the online community each time the advocacy score of that particular user crosses one of the score-based level thresholds. For example, the score-based level thresholds may be incrementally set (e.g., every 1000 points), or may be increasingly distant at each sequentially reached threshold (e.g., 1000, 2500, 7500, 15000, 50000, etc.). Note also that the score itself may be the same across all levels (e.g., 100 points for a new idea), or else may be incrementally adjusted based on level (e.g., 100 points for a new idea by a level 1 user, and 1000 points for a new idea by a level 10 user, etc.). Moreover, the user advocacy scores may be maintained on a per-brand basis (e.g., within a specific brand's online community) or else on a cross-brand basis (e.g., within a broader online community in which many brands may participate).

In addition, a set of achievement criteria may be defined (determined) within the online community, such that users may receive (be associated with) an achievement award in response to meeting the corresponding achievement criteria. Example is achievement criteria may be things such as advocacy scores, topics presented, posts, comments, likes, followers, followings, likers (users who like material by the user), commenters (users who commented on material by the user), top rankings, trending topics, shares, flags, etc. The achievement criteria and awards may be defined by brand administrators, and/or may be generic to all brands within the online community. Also, awards may be token gestures of appreciation, such as "badges" (e.g., honors, medals, etc., within the online community), or else may be associated with particular physical awards, such as gift cards, hats, etc. Generally, the advocacy scoring and associated awards need not be set forth as a competition to "win" materials, but may be a way in which brands may determine particular users that are providing a level of advocacy that they would like to commend, such as with interesting prizes or gifts (e.g., invites to unveilings, "track days" for auto manufacturers, etc.). In other words, the score and awards may simply provide a way for brands to know who to thank when they are looking to thank someone for their continued advocacy.

Figure 11:
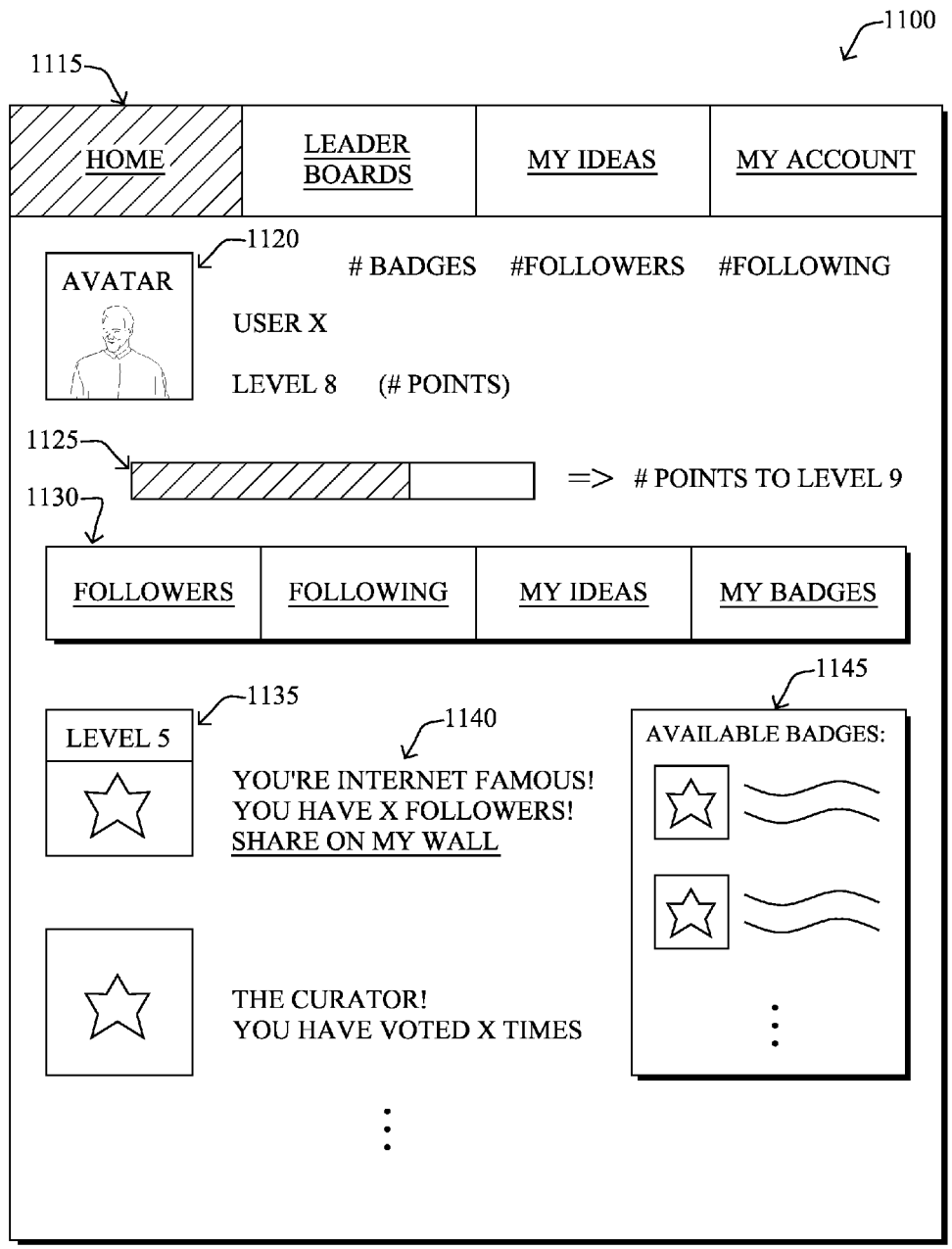
FIG. 11 illustrates an example user interface relating to a user's profile in an online community advocacy management platform.

FIG. 11 illustrates an example user interface 1100 relating to a user's profile in an online community advocacy management platform that allows a user (or administrator or other community participants) to track the user's progress within the community according to the scoring and achievement awards mentioned above. The interface 1100 may have a tab bar 1115 to assist in user navigation (e.g., "home" as shown, "leaderboards" showing rankings, "my ideas" showing specific user-generated ideas, "my account" showing administrative account control for the user, etc.), and identifying information 1120 (e.g., an avatar, user name, level, points/score, etc.). A level tracking icon 1125 may also be present, such as a progress bar that fills proportionally with each point earned by the user up until the next level is reached, at which time the bar is emptied. Additional tabs 1130 may also allow for detailed navigation, allowing a user (or administrator or other participant) to view various details maintained by the advocacy management platform 620, such as listings of followers, other users being followed by the particular user ("following"), a listing of ideas ("my ideas"), and a listing of achievements ("my badges", as shown). For example, within the badges tab, one or more earned badges (or other awards) 1135 may be displayed, along with a description 1140 of is the badge. Further, a list of badges still available (1145) may be displayed as well, in order to provide a measurable incentive to the user to reach such pre-defined goals within the online community.

Note that many people are reluctant to provide personal information to an online social network. The reasons for this reluctance are varied. Some have experienced undesired communications ("spam") when submitting personal information online, while others fear identity theft. Still other people simply may know that they can register for something, or have not yet decided whether to register. At times, however, it would still be useful for brands to be able to track these unregistered users, particularly if they are providing valuable user-generated content. Accordingly, the techniques herein may also create "ghost profiles" of users not registered with the app/plug-in, but that are participating in the social media forum to identify such non-registered users in a useful manner. In this manner, all participants may build their advocacy score regardless of the app/plug-in, which may be useful for the user if later deciding to participate officially, or else for the brand to continue to be able to monitor anonymous (yet uniquely identified) activity on an individual basis, and to identify, quantify, and foster the most valuable and influential advocates within the existing community. Note that this embodiment is also particularly useful for where a registered user has posted user-generated content, and a non-registered user/friend posts content (likes, comments, etc.) on the originally posted content.

Specifically, according to one or more embodiments herein, the online community advocacy management platform may determine user-generated activity within an online community, as described above, though now identifies the activity as being from a non-registered participant. In general, the user-generated activity may entail comments, likes, sourced topics, sourced ideas, followers, shares, flags, etc., just as for registered users above. Here, however, the platform also determines available identification (ID) information of the non-registered participant, such as a user name within the online community, a handle, an IP address, an email address, etc. If the ID is associated with a pre-existing ghost profile, then the user-generated activity by the non-registered user may be logged within the associated ghost profile, generally similar to a registered profile above. In response to there being no associated ghost profile, therefore, the platform may create a ghost profile for the non-registered participant, thus providing a log of user-generated activity by a corresponding non-registered user based on the ID.

Certain differences between a conventional profile and a ghost profile may exist in one or more preferred embodiments described herein. For instance, a ghost profile of a particular non-registered user may be associated with limitations on advocacy score, level, and/or achievements. In addition, the non-registered user may be identified to brand administrators as a uniquely identifiable anonymous user without indicating the ID, thus not exposing personal information, such as a user name (or a full user name), location, IP address, etc. Access may be provided to the ghost profile for only the administrators of the online community, or else also to the non-registered users themselves. In a specific embodiment, access to the ghost profile may also be provided for participants of the online community (again, where the non-registered user is identified to the participants as a uniquely identifiable anonymous user without indicating the ID). Note that within an individual community thread where the user-generated activity took place, the actual non-registered user's ID may be displayed with the user-generated content, such as posting the user name on the online social media website in a conventional manner. In the event that this material is pulled/copied to other locations, such as for brand-specific walls, reporting purposes, etc., then where that user-generated content is displayed, the non-registered user may be displayed with an anonymous ID.

In the event the non-registered user register eventually registers with the online community (or with the brand-specific app), then according to one or more embodiments herein, the user may be converted to a registered user, and a newly established registered profile of the registered user may be populated with logged activity from the associated ghost profile, accordingly (e.g., without the limitations mentioned above).

With regard to administrator control, the techniques herein also provide for "contribution filtering" for the online community advocacy management platform. In particular, for the platform, the techniques herein intelligently provide mechanisms and user interfaces for filtering (triaging) the view of comments and content based on advocate levels, trend rates, consumer participation, hot topics, recent activity, etc. by is gauging the likelihood of user-generated actions to cause future influence based on their algorithmic similarities to historically influential actions, and weighted based on an aggregate, compounding history of individuals throughout time.

Figure 12:
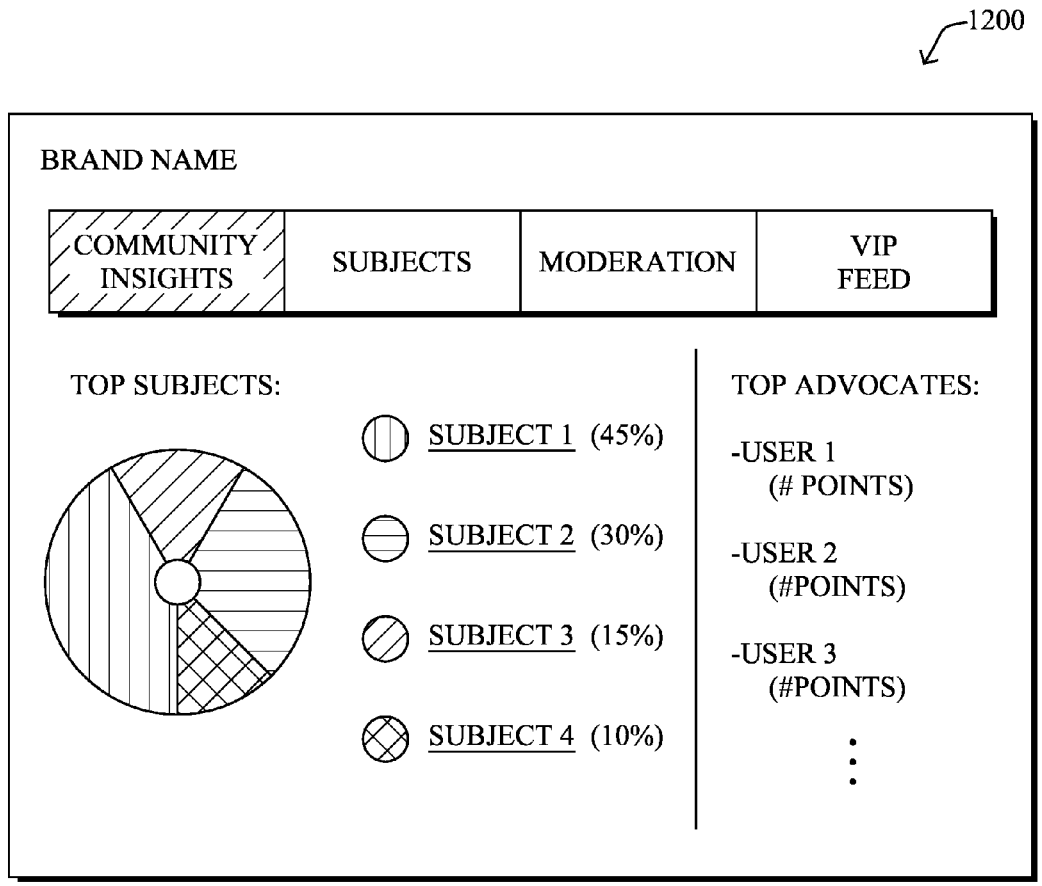
FIG. 12 illustrates an example user interface relating to administrator access to an online community advocacy management platform.

FIG. 12 illustrates an example user interface (e.g., a graphical user interface (GUI) or "dashboard") relating to administrator access to an online community advocacy management platform, particularly showing an example "community insight" page for an administrator of a particular brand name online community. (Note that the GUI may be accessible by administrators of the online community as well as by participants of the online community in additional or alternative embodiments.) Illustratively, the example GUI shows various tabs (community insight, subjects, moderation, VIP feed, etc.) that may be selected to provide different views and/or control over online community content and reports. For instance, while under the community insight tab, an administrator may be given access to the top subjects, the top advocates, or other useful collection of information.

In particular, according to the techniques herein, an online community advocacy management platform may determine aggregate attributes of historically influential user-generated actions within an online community, such as one or more user-based or content-based aggregate attributes. Example user-based attributes comprise such things as a user advocacy score, a user advocacy level, user achievements, a number of followers of the user, a number of likes of the user, etc. On the other hand, example content-based attributes comprise a trend rate of the content, consumer participation in the content, a ranking of the content, a classification of the content as recent, a number of followers of the content, a number of likes of the content, a number of links to the content, a number of shares of the content, a number of votes for the content, etc. The techniques herein may thus correspondingly determine aggregate attributes of historically influential user-generated actions by compounding the history of aggregate attributes of individual user-generated actions that resulted in historically significant community participation.

Based on the aggregate attributes of the historically influential user-generated actions, the techniques herein may thus gauge the likelihood of particular user-generated actions to cause future influence based on algorithmic similarities in their aggregate attributes to the historically influential user-generated actions. Via the GUI, the platform may then present the particular user-generated actions in a format reflective of the gauged likelihood of those particular user-generated actions to cause future influence. For example, if it is determined that users with high scores, high levels, and a high number of followers generally create a considerable community response, then the GUI may rank users according to their score, level, and number of followers in an aggregated manner. In addition, the GUI may be configured to display content (e.g., posts, ideas, etc.) from those users to indicate which posts might garner substantial attention in the future (e.g., in order to watch the subject more closely, or else to provide further brand-based content within the user-generated content). As another example, certain users in the past may have generated subjects/topics that had a proportionally high degree of consumer participation and/or customer follow-up (e.g., clicking on the brand's primary website link). As such, these users, or current posts of these users, may be presented in an up-front manner within the administrator GUI, accordingly. Notably, in a specific embodiment, the platform may accept input within the GUI to select particular aggregate attributes for use with determining algorithmic similarities (e.g., score only, or level and score, or level and achievements, or number of followers, score, and number of shared posts, etc.).

In accordance with one or more additional embodiments described herein, the online community advocacy management platform may also be configured to provide customer reward correlation, where an advocate score can be tied to a particular customer reward number for the associated brand, thus correlating advocates to customers. In this manner, awards may be triggered by the brand based on the advocate score (an aggregate of action over time) through a client-facing API (e.g., a better advocate for an airline may receive frequent flyer miles).

Figure 13:
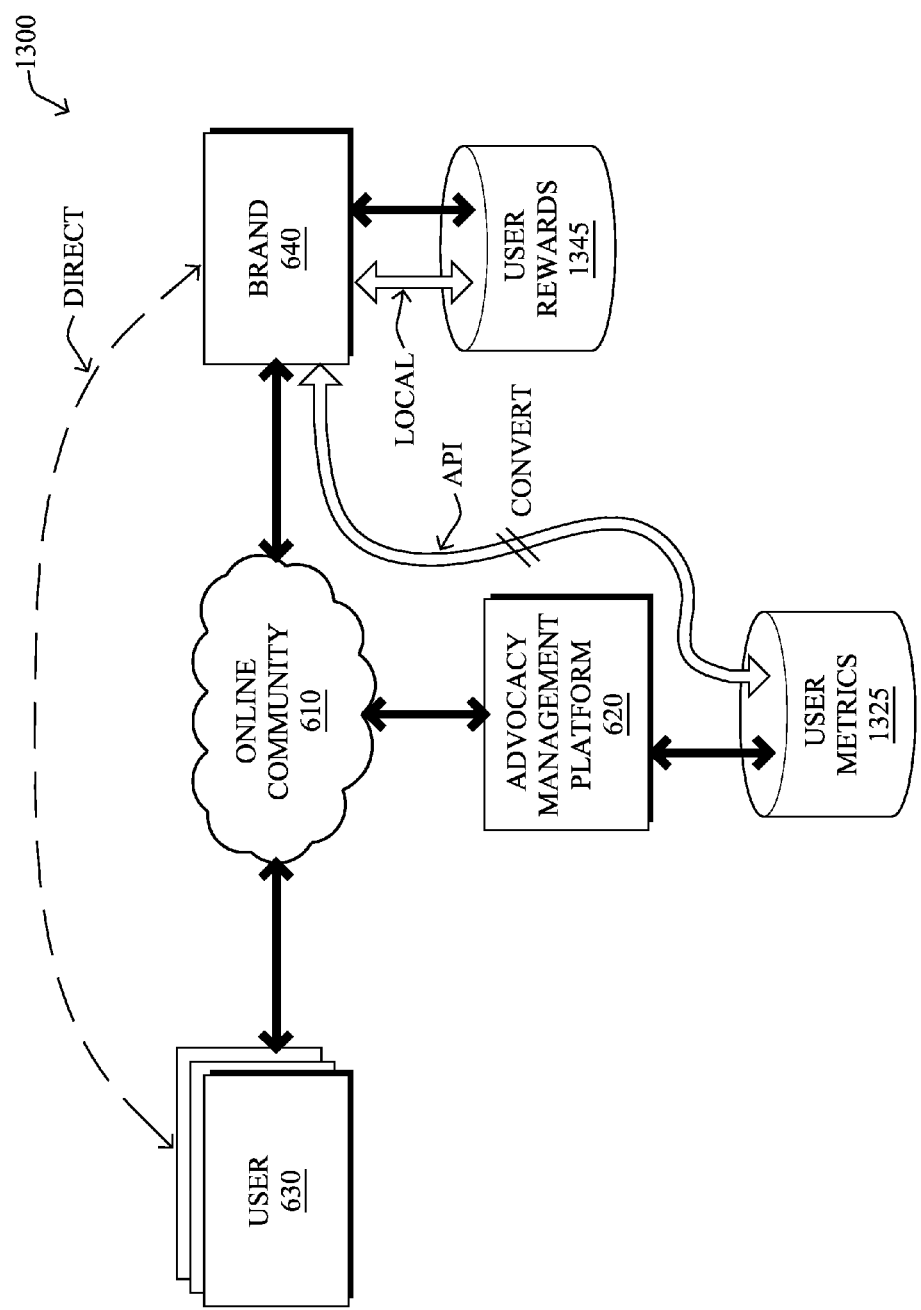
FIG. 13 illustrates an example online community advocacy management platform relating to customer reward integration.

FIG. 13 illustrates an example system 1300 relating to customer reward integration (as an extension of system 600 in FIG. 6) that illustrates the addition of user is metric storage 1325 (of advocacy management platform 620) and user reward storage 1345 (of a particular brand 640), where such storage may be provided by way of a database, list, table, etc. According to the techniques herein, the online community advocacy management platform 620 may determine an advocacy score for a user within an online community, where, as described in detail above, the advocacy score represents an aggregate of actions by the user over time with regard to a particular brand. Notably, "user metrics" 1325 in this sense may correspond to one or both of a point-based system (e.g., score) and an achievement based system (e.g., badges, levels, etc.).

The advocacy management platform 620 in this embodiment is configured to associate the advocacy score (user metrics) with a customer reward number of the particular brand. For example, various brands (e.g., particular online communities 610 or else particular brand-specific subjects within an online community 610) may offer a customer reward system that gives out membership points, frequent-flier miles, travel miles, hotel points, discount points, reward points, brand-based currency, etc. In order to track the customer rewards, the brands associate each customer with a reward number that uniquely identifies the particular customer. According to this embodiment, the advocacy management platform 620 may request (e.g., during registration or at a later time) that the online community member enter their corresponding customer reward number.

Once the association between the online community member and the customer reward number has taken place, the advocacy management platform may provide a representation of the associated advocacy score to the customer reward system of the particular brand (brand 640 and user rewards 1345), such as via an application programming interface (API) into the online community advocacy management platform 620 for the brand/administrators. Note that the advocacy score directly may be used as the representation, such that the customer reward system converts the provided advocacy score into its own system of customer reward points. However, in one or more embodiments, the advocacy management platform 620 may be configured to determine the actual customer reward points based on a conversion from the advocacy score, and thus provides the customer reward points as the representation.

Note also that the advocacy management platform may provide the representation in response to requests from the customer reward system (brand 640), or else may trigger the providing (pushing) of the representation based on the advocacy score, such as in response to certain scoring milestones, level-ups, badges, achievements, etc. Additionally, the users 630 (customers) themselves may directly interface with the customer reward system (brand 640) to either redeem reward points or to cause the initial correlation between their online community ID and their customer reward number.

The following FIGS. 14-19 illustrate example simplified procedures that generally recapitulate the concepts described above. The procedures in FIGS. 14-19 below, however, are not meant to be limiting to the scope of the disclosure, and are merely examples of generalized implementations of the techniques described herein.

Figure 14:
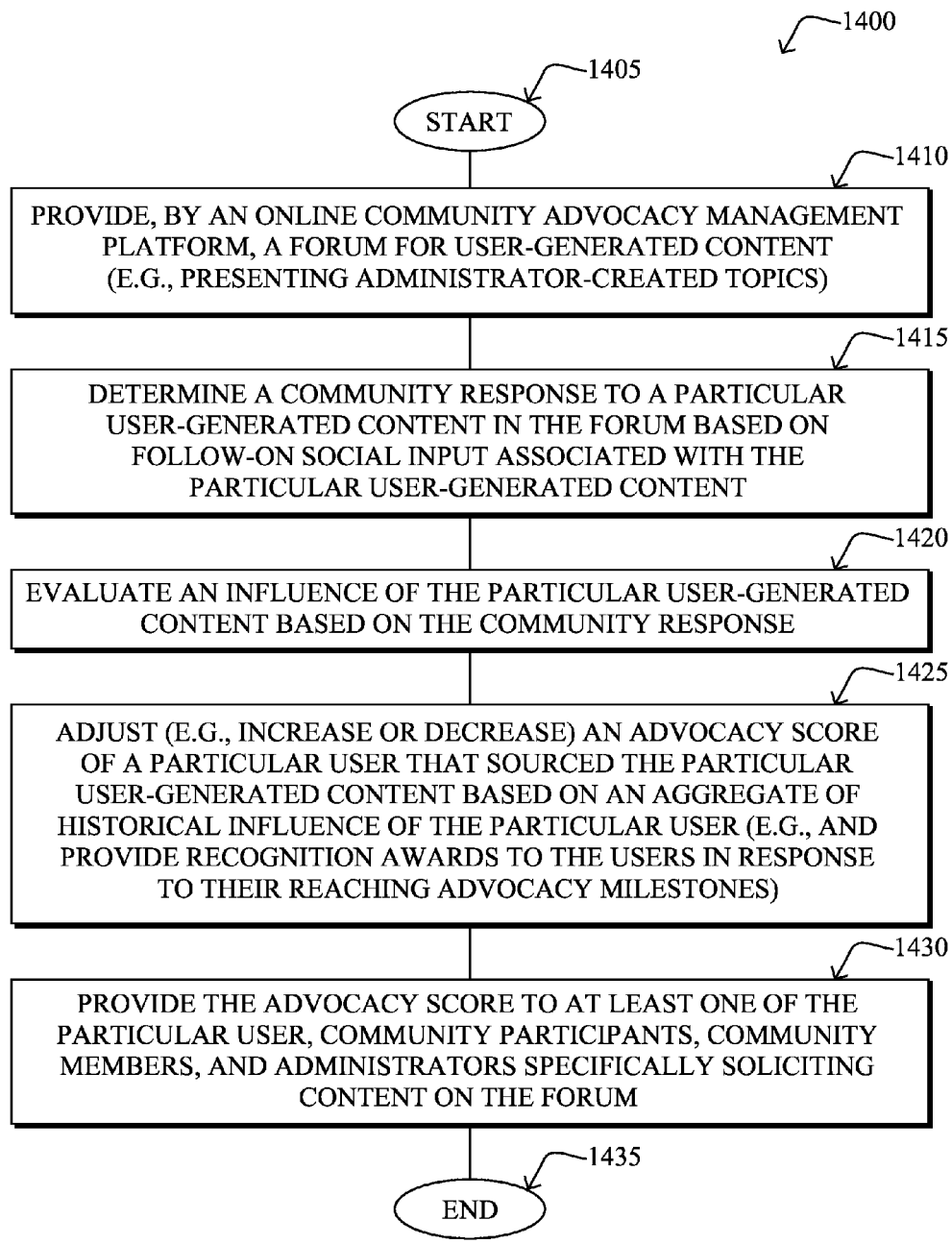
FIG. 14 illustrates an example simplified procedure for an online community advocacy management platform.

In particular, FIG. 14 illustrates an example simplified procedure 1400 for an online community advocacy management platform in accordance with one or more embodiments described herein. The procedure 1400 may start at step 1405, and continues to step 1410, where, as described in greater detail above, an online community advocacy management platform provides a forum (e.g., one or more websites or walls) for user-generated content, such as by presenting administrator-created topics. The platform generally determines a community response to a particular user-generated content in the forum in step 1415 based on follow-on social input associated with the particular user-generated content, and in step 1420 may evaluate an influence of the particular user-generated content based on the community response. Accordingly, in step 1425, the platform correspondingly adjusts (e.g., increases or decreases) an advocacy score of a particular user that sourced the particular user-generated content based on an aggregate of historical influence of the particular user. Note that as described above, this advocacy score may include or otherwise be associated with various recognition awards provided to the users in response to their reaching advocacy milestones. The advocacy score may then be provided in step 1430 in a manner as described herein, such as to at least one of the particular user, community participants, community members, and is administrators specifically soliciting content on the forum. The example simplified procedure 1400 ends in step 1435, notably with the option to return to any suitable step described above to continue managing advocacy within the online community.

Figure 15:
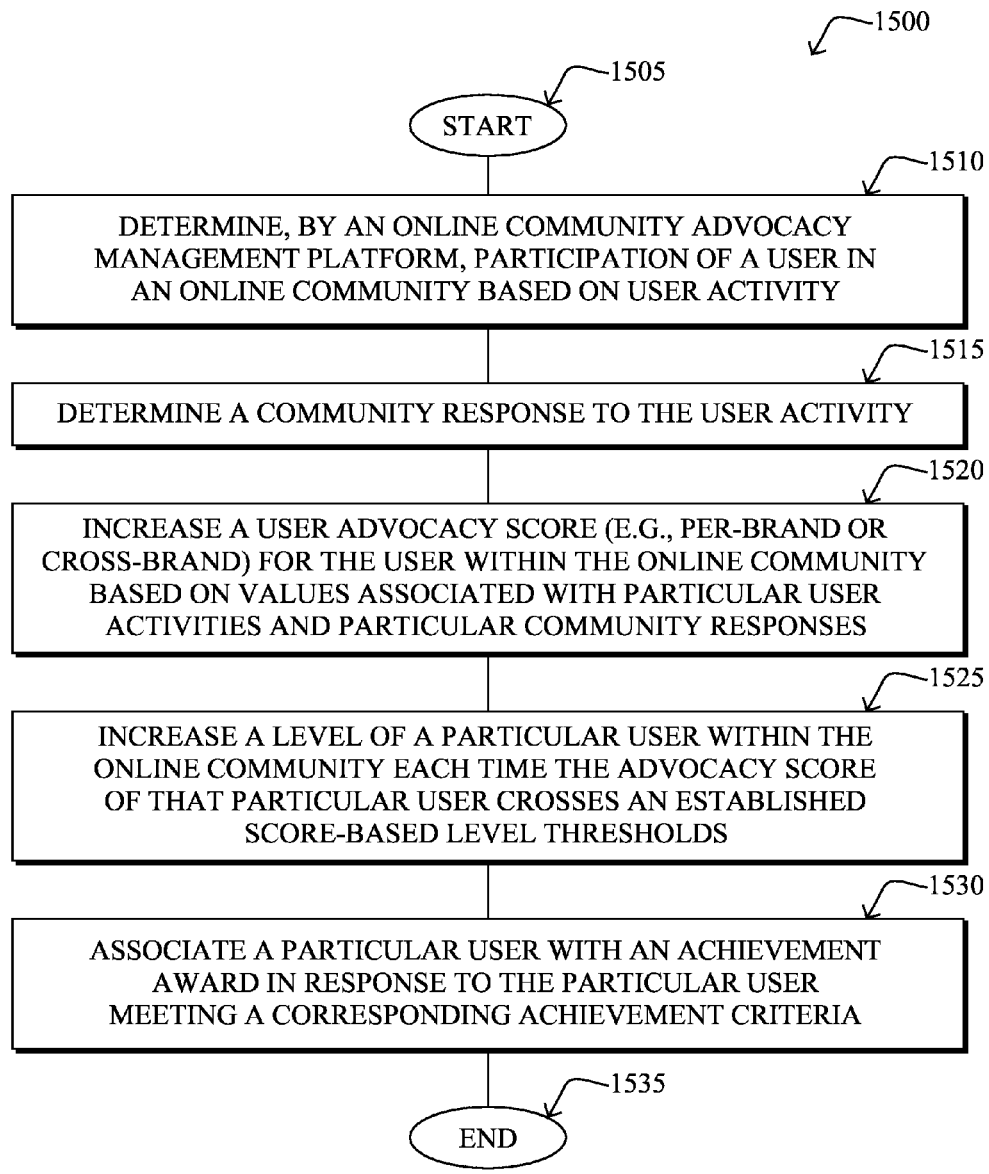
FIG. 15 illustrates an example simplified procedure for advocacy retention scoring for an online community advocacy management platform.

In addition, FIG. 15 illustrates an example simplified procedure 1500 for advocacy retention scoring for an online community advocacy management platform in accordance with one or more embodiments described herein. The procedure 1500 may start at step 1505, and continues to step 1510, where, as described in greater detail above, the online community advocacy management platform determines participation of a user in an online community based on user activity, and then in step 1515 determines a community response to the user activity. Based on values associated with particular user activities and particular community responses as described in greater detail above, in step 1520 the platform may correspondingly increase a user advocacy score (e.g., per-brand or cross-brand) for the user within the online community. Each time the advocacy score of a particular user crosses an established score-based level thresholds, then in step 1525 the platform may increase a level of that particular user within the online community. Note that also as mentioned above, in step 1530 the platform may associate a particular user with an achievement award in response to the particular user meeting a corresponding achievement criteria. The procedure 1500 illustratively ends in step 1535, though with the ability to continue managing advocacy at any appropriate step described above.

Figure 16:
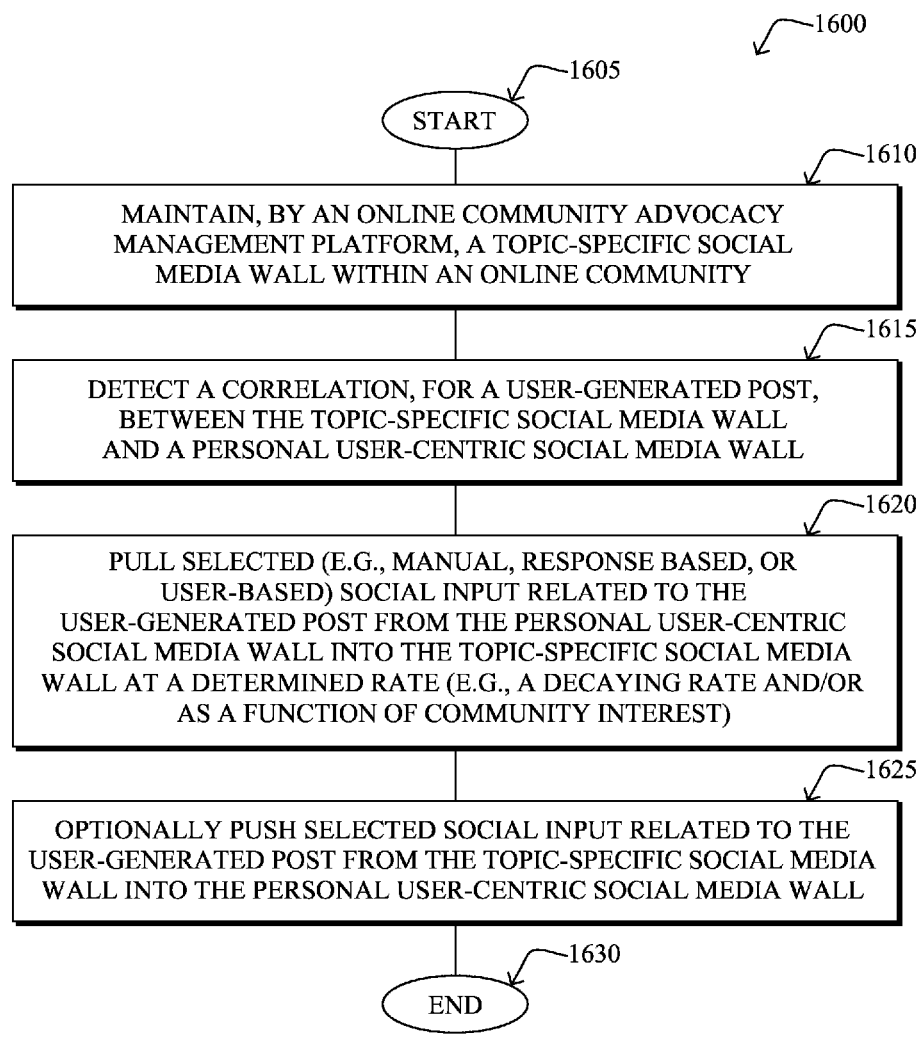
FIG. 16 illustrates an example simplified procedure for cross-platform content management for an online community advocacy management platform.

Moreover, FIG. 16 illustrates an example simplified procedure 1600 for cross-platform content management for an online community advocacy management platform in accordance with one or more embodiments described herein. The procedure 1600 may start at step 1605, and continues to step 1610, where, as described in greater detail above, the online community advocacy management platform maintains a topic-specific social media wall within an online community, and is configured to detect a correlation, for a user-generated post, between the topic-specific social media wall and a personal user-centric social media wall in step 1615. As described above, in step 1620 the platform pulls selected social input related to the user-generated post from the personal user-centric social media wall into the topic-specific social media wall at a determined rate. Specifically, as noted above, the selection of particular social input may be manually moderated, response based, or user-based. Further, the determined rate may be a decaying rate and/or may be determined as a function of community interest. Optionally, as mentioned above, selected social input related to the user-generated post may also (or alternatively) be pushed from the topic-specific social media wall into the personal user-centric social media wall in step 1625. The simplified procedure 1600 illustratively ends in step 1630, though notably still with the ability to continue managing the advocacy within the online community, accordingly.

Figure 17:
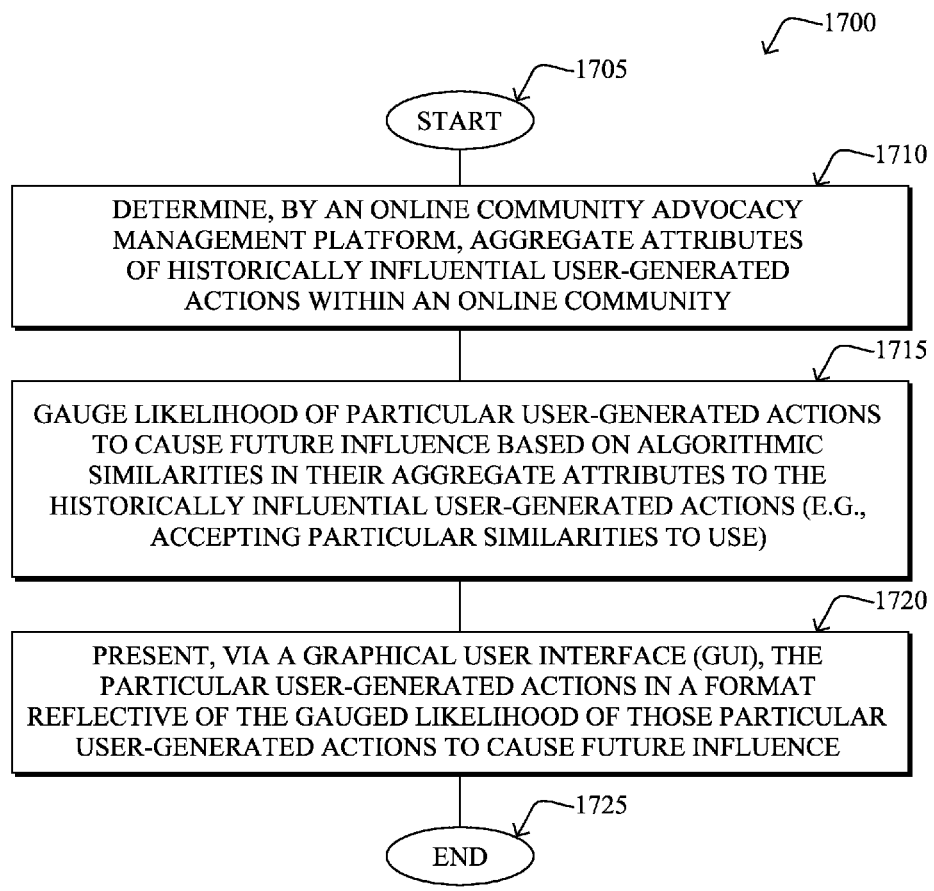
FIG. 17 illustrates an example simplified procedure for contribution filtering for an online community advocacy management platform.

Continuing further, FIG. 17 illustrates an example simplified procedure 1700 for contribution filtering for an online community advocacy management platform in accordance with one or more embodiments described herein. The procedure 1700 may start at step 1705, and continues to step 1710, where, as described in greater detail above, the online community advocacy management platform determines aggregate attributes of historically influential user-generated actions within an online community. As such, the platform may gauge likelihood of particular user-generated actions to cause future influence in step 1715 based on algorithmic similarities in their aggregate attributes to the historically influential user-generated actions (e.g., accepting particular similarities to use as mentioned above). As such, in step 1720, the platform may present the particular user-generated actions in a GUI format reflective of the gauged likelihood of those particular user-generated actions to cause future influence, and the simplified procedure 1700 ends in step 1725, where it may restart at any suitable step mentioned above to continue filtering contribution in an intelligently provided GUI format according to the techniques described herein.

Figure 18:
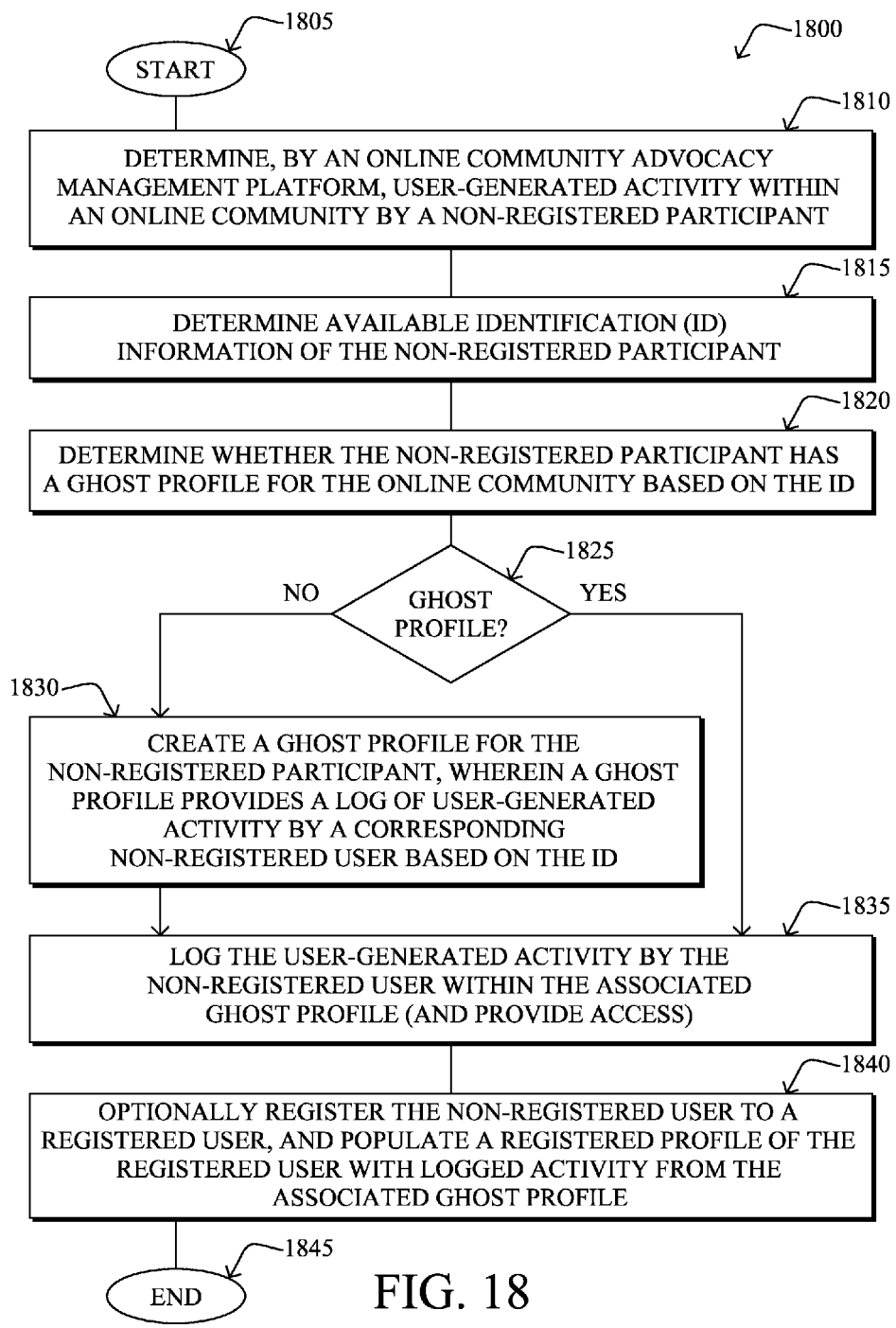
FIG. 18 illustrates an example simplified procedure for populating ghost identities for an online community advocacy management platform.

Furthermore, FIG. 18 illustrates an example simplified procedure 1800 for populating ghost identities for an online community advocacy management platform in accordance with one or more embodiments described herein. The procedure 1800 may start at step 1805, and continues to step 1810, where, as described in greater detail above, the online community advocacy management platform determines user-generated activity within an online community by a non-registered participant. In response, in step 1815, the platform determines available ID information of the non-registered participant, and determines in step 1820 whether the non-registered participant has a ghost profile for the is online community based on the ID. If there is no ghost profile in step 1825, then in step 1830 the platform may create a ghost profile for the non-registered participant, where a ghost profile provides a log of user-generated activity by a corresponding non-registered user based on the ID as described above. In step 1835, having determined an existing profile or creating a new one, the platform logs the user-generated activity by the non-registered user within the associated ghost profile, and provides access to the profile in one of the manners described above (e.g., user-only, administrator only, etc.). Optionally, in step 1840, the non-registered user may be registered to a registered user, at which time the platform may populate a registered profile of the newly registered user with logged activity from the associated ghost profile. The procedure 1800 illustratively ends in step 1845, though additional logged activity may be entered for non-registered users, accordingly.

Figure 19:
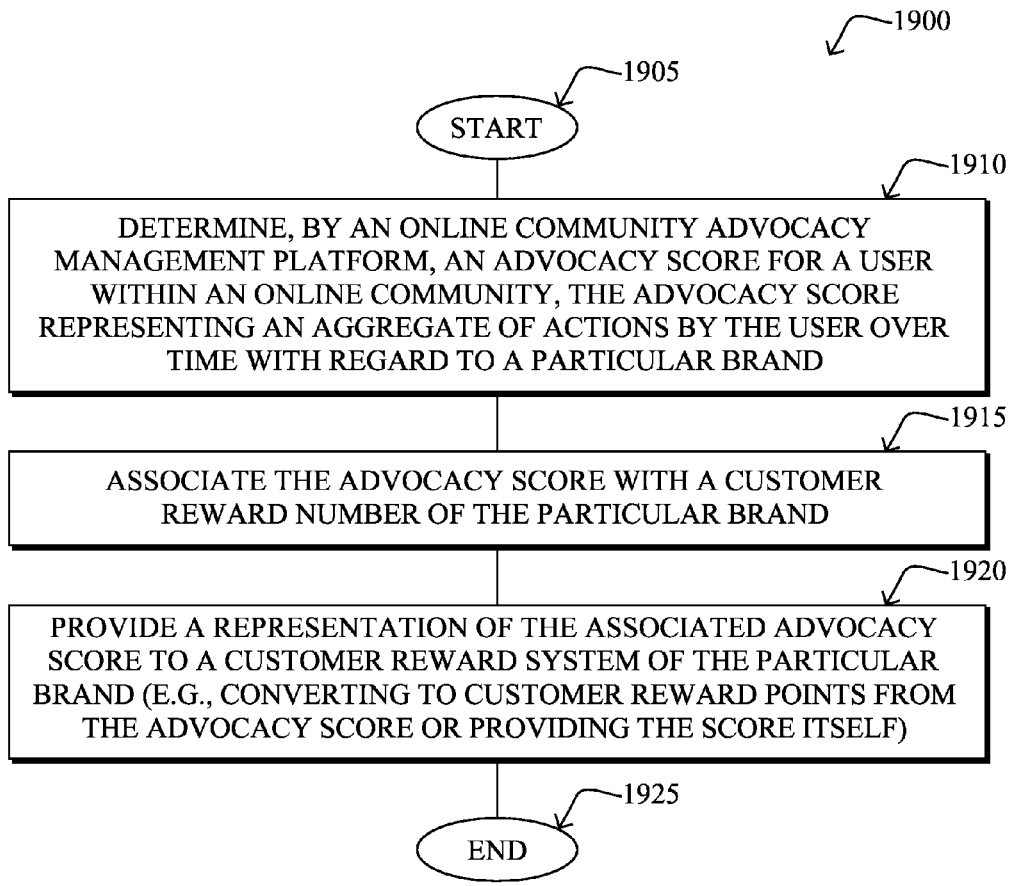
FIG. 19 illustrates an example simplified procedure for customer reward correlation for an online community advocacy management platform.

Lastly, FIG. 19 illustrates an example simplified procedure 1900 for customer reward correlation for an online community advocacy management platform in accordance with one or more embodiments described herein. The procedure 1900 may start at step 1905, and continues to step 1910, where, as described in greater detail above, the online community advocacy management platform determines an advocacy score for a user within an online community, which as detailed above may generally represent an aggregate of actions by the user over time with regard to a particular brand. Accordingly, in step 1915, the platform may associate the advocacy score with a customer reward number of the particular brand, and in step 1920, provides a representation of the associated advocacy score to a customer reward system of the particular brand. Note that as detailed above, the platform may either first convert the advocacy score to customer reward points, or else may simply provide the score itself (or some other measure thereof). The simplified procedure 1900 may then illustratively end in step 1925.

It should be noted that while certain steps within procedures 1400-1900 may be optional as described above, the steps shown in FIGS. 14-19 are merely examples for illustration, and certain other steps may be included or excluded as desired. Further, while a particular order of the steps is shown, this ordering is merely illustrative, and any suitable arrangement of the steps may be utilized without departing from the scope of the is embodiments herein. Moreover, while procedures 1400-1900 are described separately, certain steps from each procedure may be incorporated into each other procedure, and the procedures are not meant to be mutually exclusive.

The applications or processes described herein can be implemented as a series of computer-readable instructions, embodied or encoded on or within a tangible data storage medium, that when executed are operable to cause one or more processors to implement the operations described above. While the foregoing processes and mechanisms can be implemented by a wide variety of physical systems and in a wide variety of network and computing environments, the computing systems described below provide example computing system architectures of the server and client systems described above, for didactic, rather than limiting, purposes.

Figure 20:
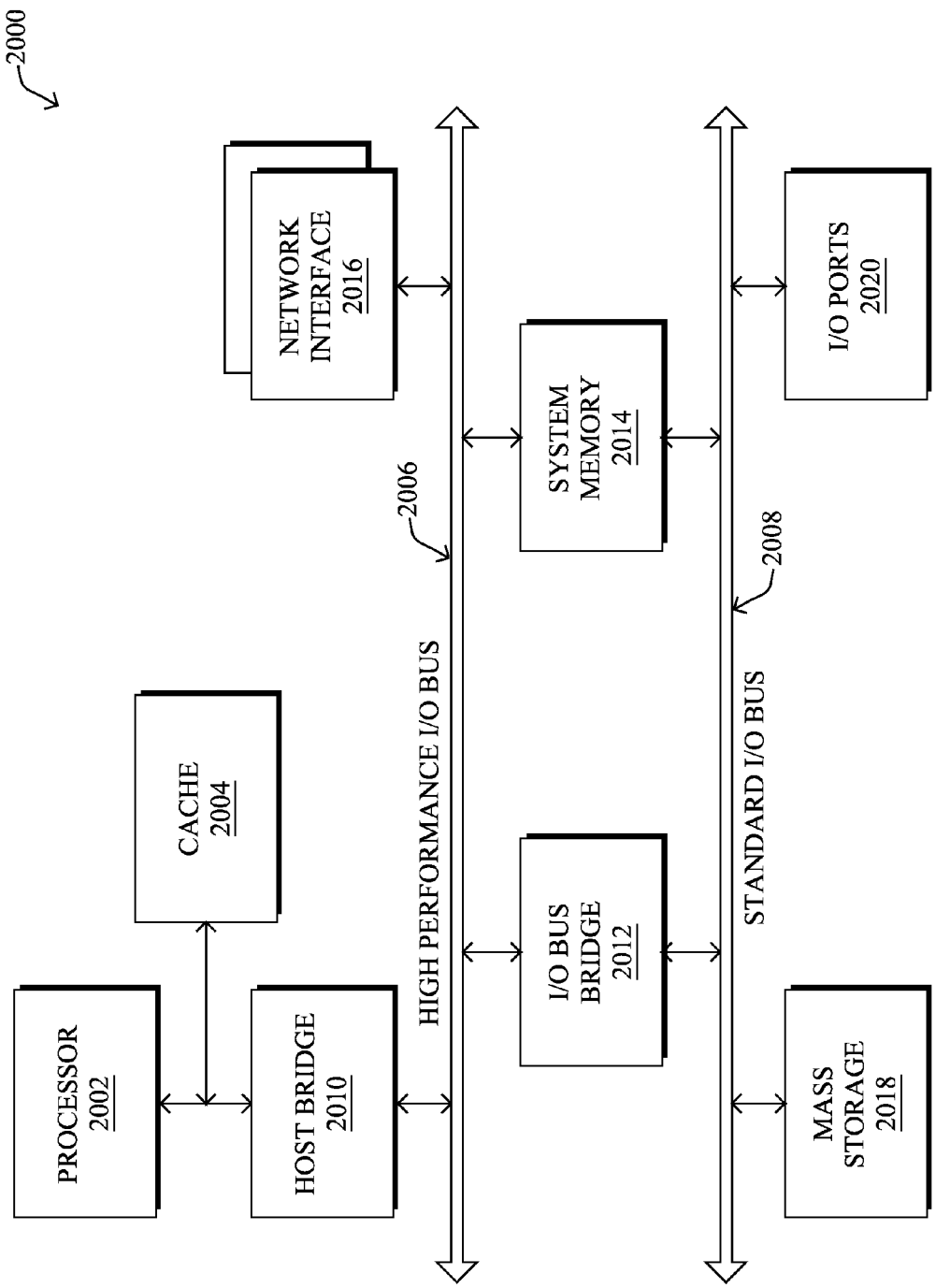
FIG. 20 illustrates an example computing system architecture.

FIG. 20 illustrates an example computing system architecture, which may be used to implement a server, a client device, etc. In one embodiment, hardware system 2000 comprises a processor 2002, a cache memory 2004, and one or more executable modules and drivers, stored on a tangible computer readable medium, directed to the functions described herein. Additionally, hardware system 2000 includes a high performance input/output (I/O) bus 2006 and a standard I/O bus 2008. A host bridge 2010 couples processor 2002 to high performance I/O bus 2006, whereas I/O bus bridge 2012 couples the two buses 2006 and 2008 to each other. A system memory 2014 and one or more network/communication interfaces 2016 couple to bus 2006. Hardware system 2000 may further include video memory (not shown) and a display device coupled to the video memory. Mass storage 2018, and I/O ports 2020 couple to bus 2008. Hardware system 2000 may optionally include a keyboard and pointing device, and a display device (not shown) coupled to bus 2008. Collectively, these elements are intended to represent a broad category of computer hardware systems, including but not limited to general purpose computer systems.

The elements of hardware system 2000 are described in greater detail below. In particular, network interface 2016 provides communication between hardware system 2000 and any of a wide range of networks, such as an Ethernet (e.g., IEEE 802.3) network, a backplane, etc. Mass storage 2018 provides permanent storage for the data and programming instructions to perform the above-described functions implemented in the servers or client devices, whereas system memory 2014 (e.g., DRAM) provides temporary storage for the data and programming instructions when executed by processor 2002. I/O ports 2020 are one or more serial and/or parallel communication ports that provide communication between additional peripheral devices, which may be coupled to hardware system 2000.

Hardware system 2000 may include a variety of system architectures; and various components of hardware system 2000 may be rearranged. For example, cache 2004 may be on-chip with processor 2002. Alternatively, cache 2004 and processor 2002 may be packed together as a "processor module," with processor 2002 being referred to as the "processor core." Furthermore, certain embodiments of the present invention may not require nor include all of the above components. For example, the peripheral devices shown coupled to standard I/O bus 2008 may couple to high performance I/O bus 2006. In addition, in some embodiments, only a single bus may exist, with the components of hardware system 2000 being coupled to the single bus. Furthermore, hardware system 2000 may include additional components, such as additional processors, storage devices, or memories.

In one implementation, the operations of the embodiments described herein are implemented as a series of executable modules run by hardware system 2000, individually or collectively in a distributed computing environment. In a particular embodiment, a set of software modules and/or drivers implements a network communications protocol stack, browsing and other computing functions, optimization processes, and the like. The foregoing functional modules may be realized by hardware, executable modules stored on a computer readable medium, or a combination of both. For example, the functional modules may comprise a plurality or series of instructions to be executed by a processor in a hardware system, such as processor 2002. Initially, the series of instructions may be stored on a storage device, such as mass storage 2018. However, the series of instructions can be tangibly stored on any suitable storage medium, such as a diskette, CD-ROM, ROM, EEPROM, etc. Furthermore, the series of instructions need not be stored locally, and could be received from a remote storage device, such as a server on a network, via network/communications interface 2016. The instructions are copied from the storage device, such as mass storage 2018, into memory 2014 and then accessed and executed by processor 2002.

An operating system manages and controls the operation of hardware system 2000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

In particular, the foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These is algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible (non-transitory) computer readable storage medium or any type of media suitable for storing electronic instructions, and coupled to a computer system bus.

Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted is according to any suitable transmission method.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. By way of example, while embodiments of the present invention have been described as operating in connection with a social networking website, the present invention can be used in connection with any communications facility that supports web applications. Furthermore, in some embodiments the term "web service" and "web-site" may be used interchangeably and additionally may refer to a custom or generalized API on a device, such as a mobile device (e.g., cellular phone, smart phone, personal GPS, personal digital assistance, personal gaming device, etc.), that makes API calls directly to a server.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method, comprising:
maintaining, by an online community advocacy management platform, a topic-specific social media wall within an online community;
detecting a correlation, for a user-generated post, between the topic-specific social media wall and a personal user-centric social media wall;
pulling selected social input related to the user-generated post from the personal user-centric social media wall into the topic-specific social media wall at a determined rate; and
determining the rate as a function of community interest in the user-generated content.

2. The method as in claim 1, further comprising:
determining the rate as a default initial rate; and
decaying the rate to a longer rate over time.

3. The method as in claim 2, further comprising:
decaying the rate to infinity to stop pulling social input.

4. The method as in claim 1, further comprising:
determining community interest from a set of actions selected from a group consisting of: followers, likes, comments, votes, shares, and flags.

5. The method as in claim 1, further comprising:
selecting the selected social input through manual administrator moderation.

6. The method as in claim 1, further comprising:
selecting the selected social input as first tier social input having a sufficient level of secondary tier social input.

7. The method as in claim 6, wherein the secondary tier social input is selected from a group consisting of: likes, comments, votes, shares, and flags.

8. The method as in claim 1, wherein pulling comprises:
accessing an application programming interface (API) of a social media website hosting the personal user-centric social media wall.

9. The method as in claim 1, wherein the social input is selected from a group consisting of: likes, comments, votes, shares, and flags.

10. The method as in claim 1, further comprising:
maintaining a ghost profile for a participant generating the social input in response to the participant not being registered with the online community.

11. The method as in claim 1, wherein the user-generated content is posted at least on the personal user-centric social media wall, the method further comprising:
pushing selected social input related to the user-generated post from the topic-specific social media wall into the personal user-centric social media wall.

12. The method as in claim 1, further comprising:
selecting the selected social input as social input from participants registered with the online community.

13. The method as in claim 1, further comprising:
selecting the selected social input as social input from participants having a user advocacy score within the online community that is greater than a minimum threshold.

14. A tangible, non-transitory, computer-readable media having software encoded thereon, the software when executed by a processor operable to:
maintain, as an online community advocacy management platform, a topic-specific social media wall within an online community;
detect a correlation, for a user-generated post, between the topic-specific social media wall and a personal user-centric social media wall;
pull selected social input related to the user-generated post from the personal user-centric social media wall into the topic-specific social media wall at a determined rate; and
determine the rate as a function of community interest in the user-generated content.

15. The computer-readable media as in claim 14, wherein the software when executed is further operable to:
determine the rate as a default initial rate; and
decay the rate to a longer rate over time.

16. The computer-readable media as in claim 14, wherein the software when executed is further operable to:
select the selected social input as first tier social input having a sufficient level of secondary tier social input.

17. The computer-readable media as in claim 14, wherein the user-generated content is posted at least on the personal user-centric social media wall, wherein the software when executed is further operable to:
push selected social input related to the user-generated post from the topic-specific social media wall into the personal user-centric social media wall.

18. An apparatus, comprising:
one or more network interfaces to communicate with a computer network;
a processor coupled to the network interfaces and adapted to execute one or more processes; and
a memory configured to store a process executable by the processor, the process when executed operable to:
maintain, within an online community advocacy management platform, a topic-specific social media wall within an online community;
detect a correlation, for a user-generated post, between the topic-specific social media wall and a personal user-centric social media wall;
pull selected social input related to the user-generated post from the personal user-centric social media wall into the topic-specific social media wall at a determined rate; and
determine the rate as a function of community interest in the user-generated content.

\* \* \* \* \*

UNITED STATES PATENT AND TRADEMARK OFFICE
CERTIFICATE OF CORRECTION

PATENT NO. : 9,015,605 B2
APPLICATION NO. : 13/722315
DATED : April 21, 2015
INVENTOR(S) : Daniel Sullivan It is certified that error appears in the above-identified patent and that said Letters Patent is hereby corrected as shown below:

In the Specification

Please amend column 1, line 60 as follows:
    for applications enabling users to view "profile" pages

Please amend column 2, line 34 as follows:
    functionality of the social networking website to provide

Please amend column 3, line 10 as follows:
    specific topic in an online community advocacy manage-

In column 5, line 47, please replace
    "framed" with "famed"

Please amend column 6, line 55 as follows:
    laptop computer, personal digital assistant (PDA), in- or

Please amend column 9, line 26 as follows:
    the information for their corresponding profile pages) for

Please amend column 10, line 2 as follows:
    works" here refer not to physical communication networks,

Please amend column 10, line 43 as follows:
    such as the action log 495. Such actions may include, for

Please amend column 11, line 15 as follows:
    sage to another member. The use of any functionality

Signed and Sealed this
First Day of September, 2015

Michelle K. Lee
*Director of the United States Patent and Trademark Office*

CERTIFICATE OF CORRECTION (continued)
U.S. Pat. No. 9,015,605 B2

Please amend column 11, line 58 as follows:
    receive data via the network 510. For example, the client

Please amend column 13, line 7 as follows:
    example, a notification may inform a member that a friend

Please amend column 13, line 48 as follows:
    cacy management platform that helps brands (or users in

Please amend column 14, line 21 as follows:
    herein, implemented as an app, tab, or plug-in to a social

Please amend column 15, line 37 as follows:
    display recent activities such as user promotions (leveling

Please amend column 16, line 56 as follows:
    be pulled from the online community (page 800) to the

Please amend column 18, line 8 as follows:
    advocacy retention scoring or other achievement-based

Please amend column 19, line 26 as follows:
    Example achievement criteria may be things such as advo-

Please amend column 20, line 1 as follows:
    1135 may be displayed, along with a description 1140 of

Please amend column 21, line 21 as follows:
    consumer participation, hot topics, recent activity, etc. by

Please amend column 22, line 36 as follows:
    FIG. 6) that illustrates the addition of user metric storage

Please amend column 23, line 53 as follows:
    community members, and administrators specifically solic-

Please amend column 25, line 6 as follows:
    registered participant has a ghost profile for the online

Please amend column 25, line 50 as follows:
    scope of the embodiments herein. Moreover, while proce-

Please amend column 27, line 39 as follows:
    representations of operations on information. These algo-

CERTIFICATE OF CORRECTION (continued)
U.S. Pat. No. 9,015,605 B2

Please amend column 28, line 12 as follows:
ted according to any suitable transmission method.